(12) United States Patent
Schaedler et al.

(10) Patent No.: US 10,806,076 B2
(45) Date of Patent: Oct. 20, 2020

(54) HIGH-EFFICIENCY LAWN MAINTENANCE TOOL AND HIGH-EFFICIENCY CUTTING BLADE

(71) Applicant: MTD PRODUCTS INC, Valley City, OH (US)

(72) Inventors: Axel Schaedler, Olmstead Falls, OH (US); Peter J. Buchanan, Elyria, OH (US)

(73) Assignee: MTD PRODUCTS INC, Valley City, OH (US)

( * ) Notice: Subject to any disclaimer, the term of this patent is extended or adjusted under 35 U.S.C. 154(b) by 111 days.

(21) Appl. No.: 16/152,440

(22) Filed: Oct. 5, 2018

(65) Prior Publication Data

US 2019/0104678 A1 Apr. 11, 2019

Related U.S. Application Data

(60) Provisional application No. 62/569,078, filed on Oct. 6, 2017.

(51) Int. Cl.
*A01D 34/73* (2006.01)
*A01D 34/00* (2006.01)
(Continued)

(52) U.S. Cl.
CPC ........... *A01D 34/73* (2013.01); *A01D 34/003* (2013.01); *A01D 34/005* (2013.01); *A01D 34/78* (2013.01);
(Continued)

(58) Field of Classification Search
CPC ...... A01D 34/006; A01D 34/69; A01D 34/73; A01D 34/003; A01D 34/005; A01D 34/78; A01D 34/66; A01D 34/68; A01D 34/733
See application file for complete search history.

(56) References Cited

U.S. PATENT DOCUMENTS 2,028,784 A 1/1936 Jennett
2,245,821 A 6/1941 Poynter
(Continued)

FOREIGN PATENT DOCUMENTS

DE 1200144 9/1965
DE 10039834 A1 3/2002
(Continued)

OTHER PUBLICATIONS

US 9,008,928 B2, 04/2015, Oishi (withdrawn)
(Continued)

*Primary Examiner* — Abigail A Risic
(74) *Attorney, Agent, or Firm* — Wegman Hessler

(57) ABSTRACT

A high-efficiency blade for a lawn maintenance tool includes a central axis and a mounting portion located on the central axis. The high-efficiency blade includes a cutting blade and a cutting blade sharpened leading edge. A cleaning blade is vertically offset from the cutting blade and is configured to mulch the associated clippings from vegetation and reduce an associated accumulation of clippings on an underside of an associated mower deck. The lawn maintenance tool can also include a deck having a separation distance between the cleaning blade and an underside of the deck. The deck can include an elevation change to vary the separation distance. The deck and high-efficiency blade can also include a forward or rearward tilt.

17 Claims, 19 Drawing Sheets

(51) Int. Cl.
  *A01D 34/78* (2006.01)
  *A01D 34/66* (2006.01)
  *A01D 34/68* (2006.01)
  *A01D 101/00* (2006.01)
(52) U.S. Cl.
  CPC .............. *A01D 34/66* (2013.01); *A01D 34/68* (2013.01); *A01D 34/733* (2013.01); *A01D 2101/00* (2013.01)

(56) References Cited

U.S. PATENT DOCUMENTS

| | | | |
|---|---|---|---|
| 2,471,367 A | 5/1949 | Cavaness | |
| 2,529,797 A | 11/1950 | Cauble | |
| 2,529,870 A | 11/1950 | Golasky | |
| 2,642,711 A * | 6/1953 | Smith | A01D 34/63 56/255 |
| 2,719,062 A | 9/1955 | Arps | |
| 2,728,182 A | 12/1955 | Fulton | |
| 2,737,772 A | 3/1956 | Jacobsen | |
| 2,760,327 A * | 8/1956 | Bovee | A01D 34/71 56/13.4 |
| 2,867,953 A | 1/1959 | Kennerty | |
| 2,876,609 A | 3/1959 | Swanson | |
| 2,888,796 A | 6/1959 | Denney | |
| 2,902,814 A | 9/1959 | Lewis | |
| 2,906,082 A | 9/1959 | Mathis | |
| 2,934,882 A | 5/1960 | Kaut, Jr. | |
| 2,955,402 A | 10/1960 | Strasel | |
| 2,957,295 A | 10/1960 | Brown | |
| 2,972,849 A | 2/1961 | Ridenour | |
| 2,983,057 A | 5/1961 | Erickson | |
| 3,002,331 A | 10/1961 | Denney | |
| 3,008,283 A | 11/1961 | Wood, Jr. | |
| 3,010,269 A | 11/1961 | Maguire | |
| 3,029,582 A | 4/1962 | Halleux | |
| 3,038,289 A | 6/1962 | Cross | |
| 3,049,854 A | 8/1962 | Denney | |
| 3,057,140 A | 10/1962 | Ridenour | |
| 3,085,386 A | 4/1963 | Slemmons | |
| 3,091,906 A | 6/1963 | Hall | |
| 3,097,467 A | 7/1963 | Konrad | |
| 3,098,337 A | 7/1963 | Teachworth | |
| 3,103,094 A | 9/1963 | Cook | |
| 3,129,549 A | 4/1964 | Stauffer | |
| 3,162,990 A * | 12/1964 | Cook | A01D 34/73 56/295 |
| 3,203,161 A | 8/1965 | Breisch | |
| 3,247,656 A | 4/1966 | Phelps | |
| 3,312,049 A | 4/1967 | Walker | |
| 3,320,732 A | 5/1967 | Kirk | |
| 3,327,460 A | 6/1967 | Blackstone | |
| 3,435,908 A | 4/1969 | Oldenburg | |
| 3,473,306 A | 10/1969 | Ewasko | |
| 3,481,124 A | 12/1969 | MacHovina | |
| 3,508,385 A | 4/1970 | Carlson | |
| 3,527,032 A * | 9/1970 | Wood | A01D 34/661 56/6 |
| 3,540,198 A | 11/1970 | Heir | |
| 3,555,798 A | 1/1971 | Eder | |
| 3,563,014 A | 2/1971 | Krewson | |
| 3,604,189 A * | 9/1971 | Harer | A01D 34/664 56/295 |
| 3,621,642 A * | 11/1971 | Leake, Jr. | A01D 34/736 56/295 |
| 3,656,286 A | 4/1972 | Glunk | |
| 3,662,529 A * | 5/1972 | Glunk | A01D 34/733 56/295 |
| 3,664,449 A | 5/1972 | Vardell | |
| 3,666,034 A | 5/1972 | Baker | |
| 3,680,294 A | 8/1972 | Dacus | |
| 3,713,284 A | 1/1973 | Dankel | |
| 3,789,942 A | 2/1974 | Kowalik | |
| 3,797,212 A * | 3/1974 | Pursel | A01D 34/005 56/255 |
| 3,826,388 A | 7/1974 | Oldenburg | |
| 3,860,079 A | 1/1975 | Hoffman | |
| 3,888,132 A | 6/1975 | Russ, Sr. | |
| 3,933,213 A | 1/1976 | Trowbridge | |
| 3,938,605 A | 2/1976 | Koch | |
| 3,938,606 A | 2/1976 | Yancey | |
| 3,948,331 A | 4/1976 | Esch | |
| 3,958,402 A * | 5/1976 | Bouet | A01D 34/63 56/295 |
| 4,003,608 A | 1/1977 | Carter | |
| 4,043,417 A | 8/1977 | Orpana | |
| 4,065,913 A | 1/1978 | Fisher | |
| 4,069,651 A | 1/1978 | Steffen | |
| 4,083,166 A | 4/1978 | Haas | |
| D248,474 S | 7/1978 | Oosterling | |
| 4,121,405 A * | 10/1978 | Wolf | A01D 34/73 56/12.9 |
| 4,161,096 A * | 7/1979 | Biberger | A01D 43/077 56/12.9 |
| 4,166,511 A | 9/1979 | Stedman | |
| 4,171,608 A | 10/1979 | Hetrick | |
| 4,184,559 A * | 1/1980 | Rass | B62D 1/26 180/401 |
| 4,189,903 A * | 2/1980 | Jackson | A01D 34/005 56/17.5 |
| 4,202,564 A | 5/1980 | Strader | |
| 4,205,510 A | 6/1980 | Raniero | |
| 4,205,512 A | 6/1980 | Thorud | |
| 4,214,426 A | 7/1980 | Lindblad | |
| 4,221,272 A | 9/1980 | Kell | |
| D260,264 S | 8/1981 | Carlsson | |
| 4,297,831 A | 11/1981 | Pioch | |
| 4,304,313 A | 12/1981 | van der Lely | |
| 4,313,297 A | 2/1982 | Maier | |
| 4,351,144 A | 9/1982 | Benenati | |
| 4,378,133 A | 3/1983 | Trautwein | |
| 4,407,112 A | 10/1983 | Shepherd | |
| 4,445,315 A | 5/1984 | Roszkowski | |
| 4,450,673 A | 5/1984 | Hutchison | |
| 4,458,955 A | 7/1984 | Webb | |
| 4,462,480 A | 7/1984 | Yasui | |
| 4,501,452 A | 2/1985 | Huang | |
| 4,566,553 A | 1/1986 | McCutcheon | |
| 4,618,015 A | 10/1986 | Yochum | |
| 4,633,658 A | 1/1987 | Nogawa | |
| 4,683,970 A | 8/1987 | Smith | |
| 4,706,769 A | 11/1987 | Latourelle | |
| 4,711,077 A | 12/1987 | Kutsukake | |
| 4,730,710 A * | 3/1988 | Granitz | F16D 67/02 192/18 R |
| 4,750,320 A | 6/1988 | Liebl | |
| 4,756,147 A | 7/1988 | Savell | |
| 4,796,322 A | 1/1989 | Steed | |
| 4,901,508 A * | 2/1990 | Whatley | A01D 34/863 56/10.4 |
| 4,953,919 A | 9/1990 | Langford | |
| 4,987,965 A | 1/1991 | Bourret | |
| 5,094,066 A * | 3/1992 | McBride | A01D 34/003 56/17.5 |
| 5,109,656 A * | 5/1992 | Zimmer | A01D 34/73 56/17.5 |
| 5,129,217 A | 7/1992 | Loehr | |
| 5,134,838 A | 8/1992 | Swisher | |
| 5,184,451 A | 2/1993 | Savipakka | |
| 5,199,251 A * | 4/1993 | Rouse | A01D 34/73 56/255 |
| 5,204,814 A | 4/1993 | Noonan | |
| 5,210,988 A | 5/1993 | Shaifer | |
| 5,224,326 A * | 7/1993 | Dunn | A01D 34/695 56/12.8 |
| 5,228,277 A | 7/1993 | Smith | |
| D340,462 S | 10/1993 | Cowart | |
| 5,267,429 A | 12/1993 | Kettler | |
| 5,273,126 A | 12/1993 | Reed | |
| 5,299,414 A | 4/1994 | Long | |
| 5,316,381 A | 5/1994 | Isaacson | |
| 5,318,141 A | 6/1994 | Hansen | |
| 5,343,681 A | 9/1994 | De Jong | |

(56) References Cited

U.S. PATENT DOCUMENTS

| | | | |
|---|---|---|---|
| 5,353,581 A * | 10/1994 | Rouse | A01D 34/73 56/255 |
| 5,363,635 A * | 11/1994 | White, III | A01D 34/005 56/255 |
| 5,372,212 A | 12/1994 | Davis | |
| 5,393,134 A | 2/1995 | Oertley | |
| 5,409,305 A | 4/1995 | Nagorcka | |
| 5,483,790 A | 1/1996 | Kuhn | |
| 5,491,962 A | 2/1996 | Sutliff | |
| 5,501,068 A * | 3/1996 | Martz | A01D 34/73 56/255 |
| 5,575,347 A | 11/1996 | Uchibaba | |
| 5,609,011 A | 3/1997 | Kuhn | |
| 5,619,846 A * | 4/1997 | Brown | A01D 34/73 56/255 |
| 5,622,234 A | 4/1997 | Nagorcka | |
| 5,649,413 A | 7/1997 | Oostendorp | |
| 5,669,213 A * | 9/1997 | Britton | A01D 34/005 56/17.5 |
| 5,782,073 A | 7/1998 | Sheldon | |
| 5,791,429 A | 8/1998 | Bergman | |
| 5,809,765 A | 9/1998 | Hastings | |
| 5,884,463 A | 3/1999 | Darzinskis | |
| 5,890,354 A * | 4/1999 | Bednar | A01D 34/005 56/255 |
| 5,899,541 A | 5/1999 | Ying | |
| 5,899,543 A | 5/1999 | Lykken | |
| 5,916,111 A * | 6/1999 | Colens | A01D 34/82 56/11.9 |
| RE36,284 E | 8/1999 | Kelderman | |
| 5,938,301 A | 8/1999 | Hostetler | |
| 5,960,617 A | 10/1999 | Sheldon | |
| 5,975,226 A | 11/1999 | Matsumoto | |
| 5,987,863 A | 11/1999 | Busboom | |
| 5,988,775 A | 11/1999 | Nordberg | |
| 6,000,766 A | 12/1999 | Takeuchi | |
| 6,006,847 A | 12/1999 | Knight | |
| 6,052,979 A | 4/2000 | Tutschka | |
| 6,065,276 A | 5/2000 | Hohnl | |
| 6,074,025 A | 6/2000 | Juncker | |
| 6,123,399 A | 9/2000 | Snyder | |
| 6,135,220 A | 10/2000 | Gleasman | |
| 6,145,290 A * | 11/2000 | Sullivan | A01D 34/005 56/17.5 |
| 6,164,399 A | 12/2000 | Bays | |
| 6,185,920 B1 | 2/2001 | Oxley | |
| 6,199,646 B1 | 3/2001 | Tani | |
| 6,241,327 B1 | 6/2001 | Gleasman | |
| D444,529 S | 7/2001 | Wagner | |
| 6,253,867 B1 | 7/2001 | Lillbacka | |
| 6,260,465 B1 | 7/2001 | Zonak | |
| 6,286,293 B1 | 9/2001 | Scag | |
| 6,289,995 B1 | 9/2001 | Fuller | |
| 6,321,515 B1 | 11/2001 | Colens | |
| 6,339,735 B1 | 1/2002 | Peless | |
| 6,446,346 B1 | 9/2002 | Castleman | |
| 6,450,280 B1 | 9/2002 | Pepka | |
| 6,485,115 B1 | 11/2002 | Egle | |
| 6,493,613 B2 | 12/2002 | Peless | |
| 6,539,694 B2 | 4/2003 | Oxley | |
| 6,547,345 B2 | 4/2003 | Phely | |
| 6,571,544 B1 | 6/2003 | Buss | |
| 6,595,603 B2 | 7/2003 | Rutz | |
| 6,604,348 B2 | 8/2003 | Hunt | |
| 6,615,939 B1 | 9/2003 | Karales | |
| 6,655,482 B2 | 12/2003 | Simmons | |
| 6,733,093 B2 | 5/2004 | Deland | |
| 6,779,328 B2 | 8/2004 | Buss | |
| 6,782,684 B2 | 8/2004 | Buss | |
| 6,810,975 B2 | 11/2004 | Nagorcka | |
| 6,840,338 B2 | 1/2005 | Bowers | |
| 6,860,571 B2 | 3/2005 | Scheetz | |
| 6,892,519 B2 | 5/2005 | Sugden | |
| 6,892,838 B2 | 5/2005 | Bowers | |
| 6,904,986 B2 | 6/2005 | Brazier | |
| 6,926,108 B1 | 8/2005 | Polakowski | |
| 6,935,095 B1 | 8/2005 | Sluder | |
| 6,962,219 B2 | 11/2005 | Hauser | |
| 6,978,590 B1 | 12/2005 | Graham | |
| 6,996,962 B1 | 2/2006 | Sugden | |
| 7,017,688 B2 | 3/2006 | Bowers | |
| 7,062,898 B2 | 6/2006 | Sarver | |
| 7,065,946 B2 | 6/2006 | Boeck | |
| 7,079,923 B2 | 7/2006 | Abramson | |
| 7,131,508 B2 | 11/2006 | Brazier | |
| 7,171,798 B1 | 2/2007 | Bernardy | |
| 7,267,414 B2 | 9/2007 | Scheetz | |
| 7,299,613 B2 | 11/2007 | Samejima | |
| D562,357 S | 2/2008 | Hardy | |
| 7,328,760 B2 | 2/2008 | Inaoka | |
| 7,367,637 B2 | 5/2008 | Gleasman | |
| 7,416,266 B2 | 8/2008 | Soucy | |
| 7,444,206 B2 | 10/2008 | Abramson | |
| 7,458,199 B2 | 12/2008 | Sarver | |
| 7,478,688 B2 | 1/2009 | Ki | |
| 7,520,348 B2 | 4/2009 | Bergsten | |
| 7,552,785 B2 | 6/2009 | Tuhy | |
| 7,562,727 B1 | 7/2009 | Hoffart | |
| 7,575,289 B2 | 8/2009 | Sugihara | |
| 7,594,377 B1 | 9/2009 | Jansen | |
| 7,597,161 B2 | 10/2009 | Brazier | |
| 7,613,543 B2 | 11/2009 | Petersson | |
| 7,617,665 B2 | 11/2009 | Yamashita | |
| 7,641,006 B2 | 1/2010 | Scheetz | |
| 7,644,788 B2 | 1/2010 | Scheetz | |
| 7,668,631 B2 | 2/2010 | Bernini | |
| 7,673,711 B1 | 3/2010 | Berg | |
| 7,677,344 B2 | 3/2010 | Medina | |
| 7,685,799 B2 | 3/2010 | Samejima | |
| 7,703,268 B2 | 4/2010 | Yanke | |
| 7,708,092 B2 | 5/2010 | Després | |
| 7,729,801 B2 | 6/2010 | Abramson | |
| 7,769,490 B2 | 8/2010 | Abramson | |
| 7,784,255 B2 | 8/2010 | Moore | |
| 7,784,884 B2 | 8/2010 | Soucy | |
| 7,841,159 B2 | 11/2010 | Washburn, IV | |
| 7,988,380 B2 | 8/2011 | Harkcom | |
| 8,002,365 B2 | 8/2011 | Jacobsen | |
| 8,011,458 B2 | 9/2011 | Hauser | |
| 8,046,103 B2 | 10/2011 | Abramson | |
| 8,083,242 B2 | 12/2011 | Brazier | |
| 8,104,846 B2 | 1/2012 | Porubcansky | |
| 8,136,333 B1 | 3/2012 | Levin | |
| 8,152,248 B2 | 4/2012 | Brazier | |
| 8,171,709 B1 | 5/2012 | Bedford | |
| 8,234,848 B2 | 8/2012 | Messina | |
| 8,239,992 B2 | 8/2012 | Schnittman | |
| 8,327,741 B2 | 12/2012 | Hsieh | |
| D678,370 S | 3/2013 | Inkster | |
| 8,428,776 B2 | 4/2013 | Letsky | |
| 8,430,188 B2 | 4/2013 | Hansen | |
| 8,452,450 B2 | 5/2013 | Dooley | |
| 8,532,822 B2 | 9/2013 | Abramson | |
| 8,579,065 B2 | 11/2013 | Bergsten | |
| 8,600,582 B2 | 12/2013 | Bernini | |
| 8,676,378 B2 | 3/2014 | Tian | |
| 8,746,815 B2 | 6/2014 | Reshad | |
| 8,818,602 B2 | 8/2014 | Yamamura | |
| 8,855,861 B2 | 10/2014 | Goebel | |
| 8,868,237 B2 | 10/2014 | Sandin | |
| 8,893,461 B2 | 11/2014 | Nikkel | |
| 8,963,693 B2 | 2/2015 | Lo | |
| 8,983,693 B2 | 3/2015 | Yamamura | |
| 9,008,915 B2 | 4/2015 | Kang | |
| D760,806 S | 7/2016 | Cmich | |
| D776,169 S | 1/2017 | Cmich | |
| D780,814 S | 3/2017 | Ainge | |
| D781,349 S | 3/2017 | Cmich | |
| D795,299 S | 8/2017 | Cmich | |
| D795,300 S | 8/2017 | Cmich | |
| D796,559 S | 9/2017 | Bruce | |
| D797,530 S | 9/2017 | Cmich | |
| D799,555 S | 10/2017 | Cmich | |

(56) References Cited

U.S. PATENT DOCUMENTS

| | | |
|---|---|---|
| 9,807,930 B1 | 11/2017 | Lydon |
| 9,930,829 B2 | 4/2018 | Schaedler |
| 9,936,635 B2 | 4/2018 | Gottinger |
| 2002/0066263 A1 | 6/2002 | Megli |
| 2002/0153188 A1 | 10/2002 | Brandt |
| 2003/0180370 A1 | 9/2003 | Lesniak |
| 2004/0031255 A1 | 2/2004 | Kenny |
| 2004/0093842 A1 | 5/2004 | Cooper |
| 2004/0099451 A1 | 5/2004 | Nagorcka |
| 2004/0163373 A1 | 8/2004 | Adams |
| 2004/0237492 A1 | 12/2004 | Samejima |
| 2004/0244349 A1 | 12/2004 | Meier |
| 2005/0035655 A1 | 2/2005 | Beckstrom |
| 2005/0077984 A1 | 4/2005 | Lee |
| 2005/0126152 A1 | 6/2005 | Boeck |
| 2005/0248214 A1 | 11/2005 | Sugihara |
| 2005/0279072 A1 | 12/2005 | Sarver |
| 2006/0150361 A1 | 7/2006 | Aldred |
| 2006/0168933 A1 | 8/2006 | Hill |
| 2006/0179809 A1 | 8/2006 | Sarver |
| 2007/0062170 A1 | 3/2007 | Finkner |
| 2007/0193240 A1 | 8/2007 | Nafziger |
| 2007/0234699 A1 | 10/2007 | Berkeley |
| 2007/0273152 A1 | 11/2007 | Kawakami |
| 2007/0289282 A1 | 12/2007 | Yamashita |
| 2008/0072555 A1 | 3/2008 | Samejima |
| 2008/0168756 A1 | 7/2008 | Nafziger |
| 2008/0277127 A1 | 11/2008 | Dixon |
| 2009/0087257 A1 | 4/2009 | Harkcom |
| 2009/0126330 A1 | 5/2009 | Moore |
| 2009/0266042 A1 | 10/2009 | Mooney |
| 2009/0308669 A1 | 12/2009 | Vos |
| 2010/0060075 A1 | 3/2010 | Hansen |
| 2010/0101201 A1 | 4/2010 | Yanke |
| 2010/0139994 A1 | 6/2010 | Hansen |
| 2010/0307843 A1 | 12/2010 | Lawson |
| 2011/0234153 A1 | 9/2011 | Abramson |
| 2012/0159916 A1* | 6/2012 | Ishii ............... B60L 58/40 56/10.2 A |
| 2012/0161511 A1 | 6/2012 | Brazier |
| 2012/0242142 A1 | 9/2012 | Kautsch |
| 2012/0318114 A1 | 12/2012 | Esain Eugui |
| 2013/0128043 A1* | 5/2013 | Avnery ............ A01D 34/008 348/148 |
| 2013/0192905 A1 | 8/2013 | Janzen |
| 2013/0205736 A1 | 8/2013 | Maruyama |
| 2013/0211646 A1 | 8/2013 | Yamamura |
| 2013/0211647 A1 | 8/2013 | Yamamura |
| 2013/0247531 A1 | 9/2013 | Campione |
| 2013/0291506 A1 | 11/2013 | Johnson |
| 2013/0317680 A1 | 11/2013 | Yamamura |
| 2013/0327007 A1* | 12/2013 | Eavenson, Sr. ...... A01D 34/733 56/295 |
| 2014/0031979 A1 | 1/2014 | Borinato |
| 2014/0058611 A1 | 2/2014 | Borinato |
| 2014/0175865 A1 | 6/2014 | Korus |
| 2014/0288763 A1 | 9/2014 | Bennett |
| 2014/0324269 A1 | 10/2014 | Abramson |
| 2015/0047310 A1 | 2/2015 | Schreiner |
| 2015/0128548 A1 | 5/2015 | Andre |
| 2015/0134202 A1 | 5/2015 | Dawson |
| 2016/0081269 A1 | 3/2016 | Gottinger |
| 2016/0106031 A1* | 4/2016 | Bejcek ............ B60W 30/18009 701/70 |
| 2016/0278287 A1 | 9/2016 | Kasai |
| 2016/0278289 A1 | 9/2016 | Kasai |
| 2016/0345490 A1* | 12/2016 | Schaedler ............ A01D 34/003 |
| 2016/0353659 A1 | 12/2016 | Schaedler |
| 2016/0366822 A1* | 12/2016 | Teko ............... A01D 45/10 |
| 2017/0006776 A1 | 1/2017 | Svensson |
| 2017/0303469 A1* | 10/2017 | Schaedler ............ A01D 34/67 |
| 2017/0367257 A1 | 12/2017 | Cmich |
| 2017/0367260 A1 | 12/2017 | Sasaki |
| 2018/0054963 A1 | 3/2018 | Lydon |

FOREIGN PATENT DOCUMENTS

| | | |
|---|---|---|
| EP | 0554560 A1 | 8/1993 |
| EP | 0578504 | 2/1997 |
| EP | 2648307 | 10/2013 |
| EP | 2656718 | 10/2013 |
| EP | 2852029 | 3/2015 |
| EP | 2997810 A1 | 3/2016 |
| EP | 3342268 A1 | 7/2018 |
| EP | 3342269 A1 | 7/2018 |
| FR | 1519808 A | 4/1968 |
| FR | 2331949 A1 | 6/1977 |
| FR | 2733115 A1 | 10/1996 |
| GB | 1478780 A | 7/1977 |
| GB | 2028085 A | 3/1980 |
| GB | 2369765 A | 6/2002 |
| JP | 07205852 A | 8/1995 |
| JP | 10129544 | 5/1998 |
| JP | 3966834 B2 | 12/2004 |
| JP | 3937643 | 6/2007 |
| JP | 2013162764 A | 8/2013 |
| JP | 2016140263 A | 8/2016 |
| KR | 1020010078749 | 8/2001 |
| WO | 9311022 | 6/1993 |
| WO | 9323986 A1 | 12/1993 |
| WO | 2002051241 | 4/2003 |
| WO | 2003059720 | 7/2003 |
| WO | 2005101945 | 11/2005 |
| WO | 2010046905 | 4/2010 |
| WO | 2012036572 A2 | 3/2012 |
| WO | 2013077413 A1 | 5/2013 |
| WO | 2014008378 | 1/2014 |
| WO | 2014127212 | 8/2014 |

OTHER PUBLICATIONS

International Search Report in PCT Application No. PCT/US2018/054495 dated Feb. 22, 2019, pp. 1-4.
International Search Report and Written Opinion dated Oct. 7, 2013 for related PCT/US2013/049289.
Office Action dated Feb. 8, 2016 for related U.S. Appl. No. 14/412,285.
Office Action dated Jan. 29, 2016 for related U.S. Appl. No. 14/412,133.
Notice of Allowance dated Jan. 4, 2017 for related U.S. Appl. No. 14/484,993.
Office Action dated Mar. 10, 2017 for related U.S. Appl. No. 15/381,003.
Office Action dated May 19, 2017 for related U.S. Appl. No. 15/450,896.
Office Action dated Apr. 1, 2017 for related CN App. No. 201480050347.5.
Corrected Notice of Allowability dated May 31, 2017 for U.S. Appl. No. 14/484,993.
Notice of Allowance dated Jun. 6, 2017 for U.S. Appl. No. 14/412,285.
International Search Report and Written Opinion dated Oct. 11, 2013 for related PCT/US2013/049278.
International Search Report and Written Opinion dated Nov. 5, 2015 for related PCT/US2015/046266.
International Search Report and Written Opinion dated Dec. 5, 2014 for related PCT/US2014/055424.
Office Action dated May 27, 2016 for related U.S. Appl. No. 14/484,993.
International Search Report and Written Opinion dated Dec. 7, 2016 for related PCT/US2016/035025.
Office Action dated Apr. 14, 2016 for related U.S. Appl. No. 14/724,172.
Office Action dated Nov. 29, 2016 for related U.S. Appl. No. 14/484,899.
Final Office Action dated Jul. 12, 2016 for related U.S. Appl. No. 14/412,285.
Notice of Allowance dated Dec. 27, 2017 for U.S. Appl. No. 15/166,378.
Notice of Allowance dated Feb. 28, 2018 for U.S. Appl. No. 29/606,974.

(56) References Cited

OTHER PUBLICATIONS

Office Action dated May 18, 2018 for U.S. Appl. No. 15/789,894 (pp. 1-5).
Office Action dated Jul. 27, 2018 for U.S. Appl. No. 15/174,738 (p. 1-10).
Office Action dated Sep. 20, 2018 for U.S. Appl. No. 15/492,865 (pp. 1-9).
Office Action dated Oct. 2, 2018 for U.S. Appl. No. 15/633,563 (pp. 1-12).
Notice of Allowance dated Oct. 11, 2018 for U.S. Appl. No. 15/798,894 (pp. 1-5).

* cited by examiner

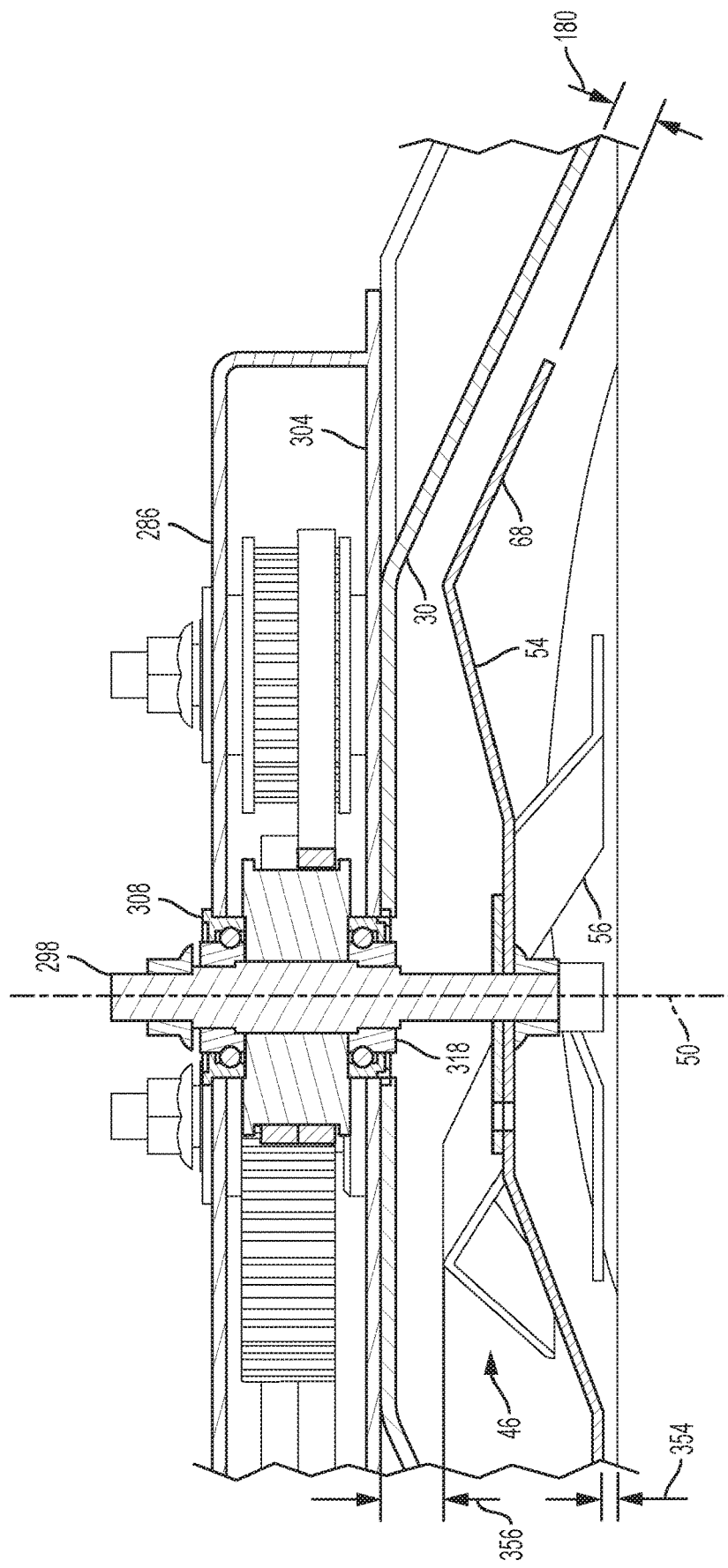

HIGH-EFFICIENCY LAWN MAINTENANCE TOOL AND HIGH-EFFICIENCY CUTTING BLADE

This application claims the benefit of U.S. Provisional Application No. 62/569,078, filed Oct. 6, 2017, the entire disclosure of which is hereby incorporated herein by reference.

FIELD OF THE DISCLOSURE

The present disclosure is directed to a high-efficiency lawn maintenance tool and high-efficiency blade configured to perform a grass cutting function utilizing a reduced amount of energy than a typical lawn maintenance tool.

BACKGROUND

Typical walk-behind lawn mowers and riding mowers utilize an engine or other power supply to rotate one or more mower blades. The mower blades are typically formed by stamping a thick metal sheet in order to form an elongated metal blade. These thick, heavy blades rotate at high speeds, which requires significant torque to maintain such high rotational speeds of the blade(s). As a result, large engines—typically in the form of a combustion engine—are attached to a mower deck or a mower frame, and these large engines are needed to produce the high torque requirements for rotating the heavy blades. Thus, improvements are desired to reduce the noise level of lawn mower power sources and provide relatively high-efficiency blades to reduce the amount of energy needed to rotate the blade.

BRIEF SUMMARY

According to one aspect of the present disclosure, a high-efficiency blade for a lawn maintenance tool includes a central axis and a mounting portion located on the central axis. The high-efficiency blade also includes a cutting blade having at least one segment and a cutting blade sharpened leading edge. The cutting blade sharpened leading edge is generally parallel to a driven surface and the cutting blade sharpened leading edge is configured to cut clippings from vegetation. The high-efficiency blade further includes a cleaning blade. The cleaning blade is vertically offset from the cutting blade and is configured to mulch the associated clippings from vegetation and reduce an associated accumulation of clippings on an underside of an associated mower deck.

According to another aspect of the present disclosure, a high-efficiency lawn maintenance tool comprises a frame and a deck. The deck is attached to the frame and the deck defines a downward facing space. The high-efficiency lawn maintenance tool also includes a high-efficiency blade located within the downward facing space. The high-efficiency blade includes a central axis and a mounting portion located on the central axis of the high-efficiency blade. The high-efficiency blade also includes a cutting blade including at least one segment and a cutting blade sharpened leading edge. The cutting blade sharpened leading edge is generally parallel to an associated driven surface and is configured to cut clippings from vegetation. The high-efficiency blade further includes a cleaning blade that is vertically offset from the cutting blade. The high-efficiency lawn maintenance tool further includes a power source that is attached to one of the frame or the deck. The power source provides rotational power to the high-efficiency blade. The high-efficiency lawn maintenance tool still further includes a plurality of ground engaging members attached to one of the frame or the deck. The cleaning blade is configured to follow a rotational path about the central axis, and a portion of the cleaning blade is located within 1-inch to $\frac{1}{16}$-inch of the deck over a majority of the rotational path. The deck defines an elevation change such that the cleaning blade is not located within 1-inch to $\frac{1}{16}$-inch of the deck over a minority of the rotational path of the cleaning blade.

According to another aspect of the present disclosure, a high-efficiency lawn maintenance tool includes a frame and a deck attached to the frame. The deck defines a downward facing space. The high-efficiency lawn maintenance tool also includes a high-efficiency blade located within the downward facing space. The high-efficiency blade includes a central axis and a mounting portion located on the central axis of the high-efficiency blade. The high-efficiency blade also includes a cutting blade including at least one segment and a cutting blade sharpened leading edge. The cutting blade sharpened leading edge is generally parallel to an associated driven surface and is configured to cut clippings from vegetation. The high-efficiency blade further includes a cleaning blade that is vertically offset from the cutting blade. The high-efficiency lawn maintenance tool further includes a power source that is attached to one of the frame or the deck. The power source provides rotational power to the high-efficiency blade. The high-efficiency lawn maintenance tool still further includes a plurality of ground engaging members attached to one of the frame or the deck. The deck and the high-efficiency blade are tilted such that the central axis is not vertical.

Advantages of the present disclosure will become more apparent to those skilled in the art from the following description of the embodiments of the disclosure which have been shown and described by way of illustration. As will be realized, the disclosed apparatus are capable of other and different embodiments, and their details are capable of modification in various respects.

BRIEF DESCRIPTION OF SEVERAL VIEWS OF THE DRAWINGS

These and other features of the present disclosure, and their advantages, are illustrated specifically in embodiments of the disclosure now to be described, by way of example, with reference to the accompanying diagrammatic drawings, in which:

FIG. 8 is a cross-section view of a high-efficiency blade attached to a multi-spindle lawn maintenance tool and is taken along line 8-8 of FIG. 21;

Figure 1:
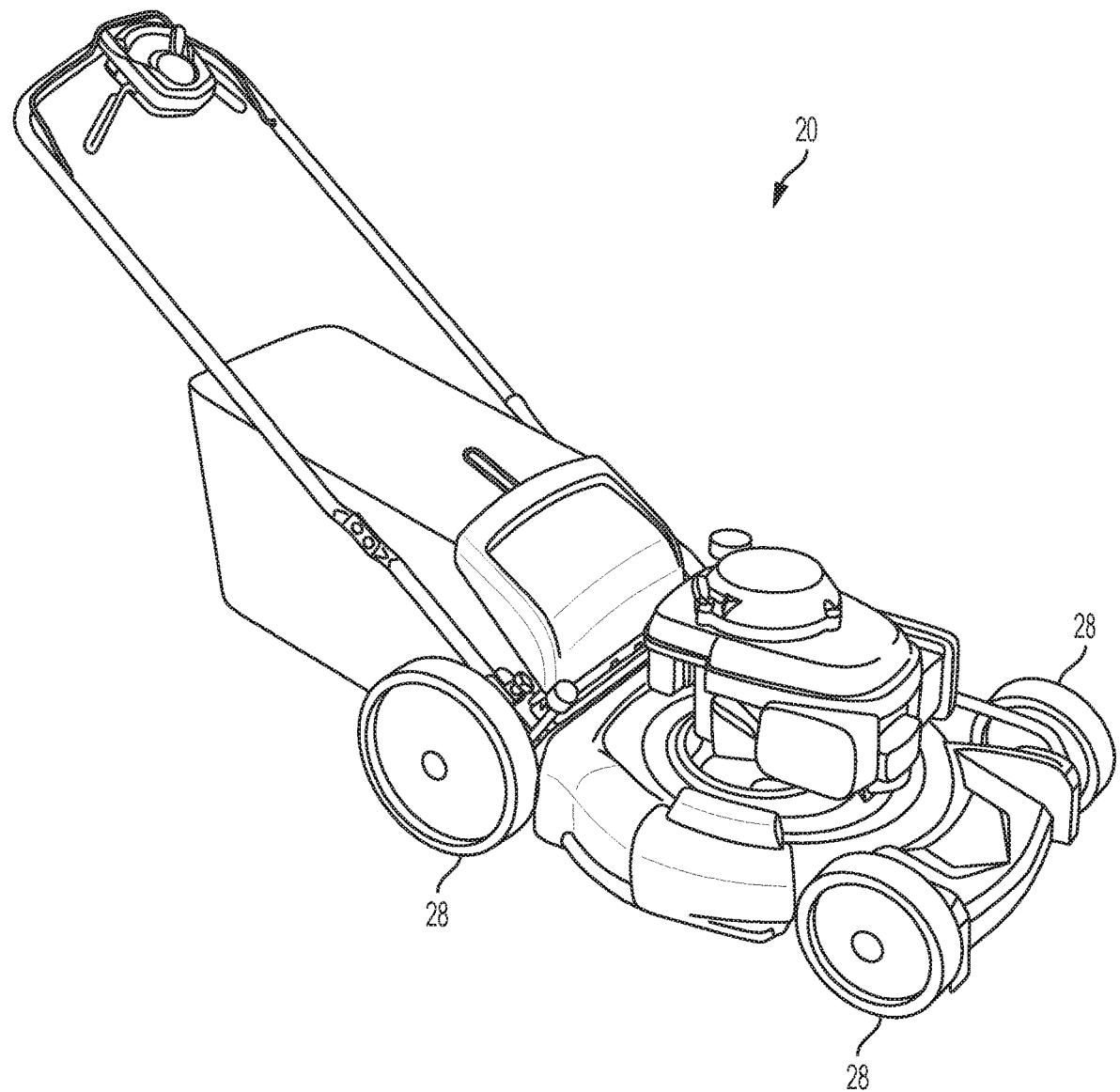
FIG. 1 is a perspective view of an example traditional lawn maintenance tool according to at least one embodiment.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

Figure 2:
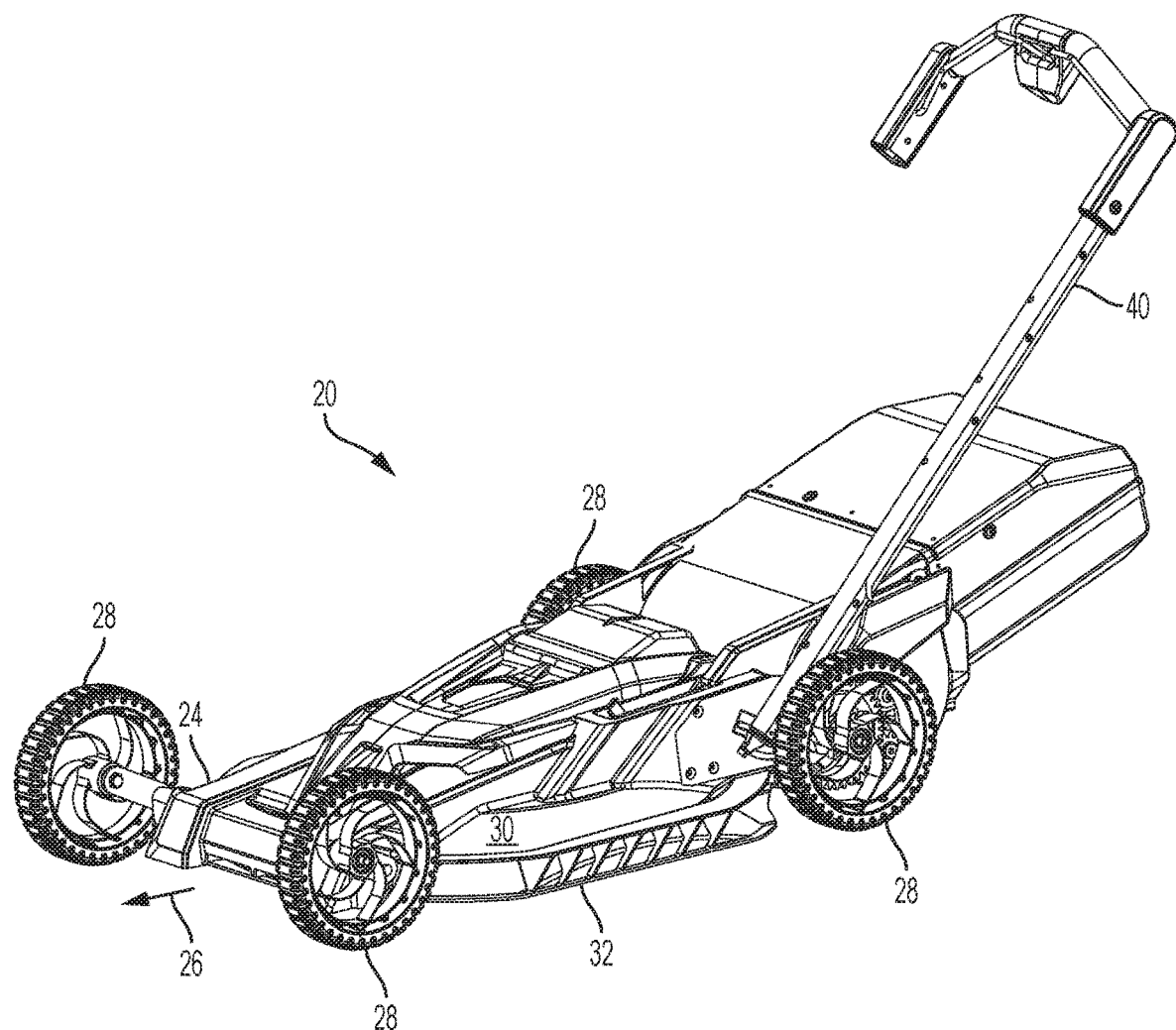
FIG. 2 is similar to FIG. 1, showing a perspective view of a high-efficiency lawn maintenance tool.

Referring to FIG. 1, an exemplary embodiment of a high-efficiency lawn maintenance tool 20 is shown. The high-efficiency lawn maintenance tool 20 is shown as being a walk-behind mower, but it should be understood by one having ordinary skill in the art that the high-efficiency lawn maintenance tool 20 may also be a riding mower, a stand-on mower, a robotic mower, a manual-powered mower, or any other tool configured to mow a lawn. FIG. 1 shows a traditional walk-behind mower with an internal combustion engine. FIG. 2 shows a high-efficiency lawn maintenance tool as a battery-powered electric walk-behind lawn mower. Of course, other examples are also possible, such as a corded electric walk-behind model. The high-efficiency lawn maintenance tool 20 can include a frame 24. In one example, the frame 24 provides a skeletal support for many if not all of the remainder of the components that make up the high-efficiency lawn maintenance tool 20. This feature eliminates the need for a typical "deep draw" deck of stamped metal that can often be heavy and relatively expensive to manufacture due to strength and durability requirements to support the remainder of the mower parts. The frame 24 can comprise a metal structure or any other material suited for the strength and durability requirements of the frame 24. In an example, the frame 24 can be constructed of tubular metal components arranged in a "U"-shape and oriented such that the open portion of the U is facing the forward direction (represented by arrow 26) of the high-efficiency lawn maintenance tool 20.

The high-efficiency lawn maintenance tool 20 includes ground engaging members 28 attached to the frame 24. Any suitable ground engaging member 28 can be used with the described high-efficiency lawn maintenance tool 20 including, but not limited to, pneumatic tires, non-pneumatic tires/wheels, track assemblies, and wheels with built-in suspension features. The ground engaging members 28 can be wheels attached to the frame 24 with a snap-on feature that does not require tools, such as hand tools.

The high-efficiency lawn maintenance tool 20 includes a deck 30. The deck 30 can include various parts including a deck shell 32. Use of the below described high-efficiency blade assembly enables the deck shell 32 and the deck 30 to be of relatively short vertical height when compared to many known walk-behind mower decks. This lessened height requirement, or "low profile" deck, can provide benefits such as minimized storage volume requirements, minimized shipping volume requirements and the like. The deck shell 32 can be constructed of any suitable material, for example, molded plastic.

The high-efficiency lawn maintenance tool 20 includes a power source 36 (best seen in FIG. 23) configured to provide rotational power to a high-efficiency blade used to cut grass and/or vegetation. In the illustrated embodiment of FIG. 2, the power source 36 is a battery-powered electric motor, but it should be understood by one having ordinary skill in the art that the power source 36 may also be an internal combustion engine, a hybrid-electric motor, or any other power source capable of providing a rotational power output. The power source 36 is mounted to one or both of the frame 24 and the deck 30, and the power source 36 includes a drive shaft (not shown) extending through the frame 24 and the deck 30.

The illustrated exemplary embodiment of high-efficiency lawn maintenance tool 20 includes a user-operated handle 40 connected to the frame 24 and/or the deck 30. In one example, the collapsible handle is "U"-shaped, with the ends of the U being mounted to the handle mounts and the closed portion of the U serving as a handle for an operator to push or otherwise control the high-efficiency lawn maintenance tool 20. The collapsible handle can include any number of ergonomic designs to ease operator interaction. In another example, the handle 40 can comprise a "J"-shape that connects to the frame 24 on only one side. Of course, other shapes of handle 40 are also contemplated.

The handle 40 can be folded toward the frame 24 for storage and/or shipping purposes. The handle 40 can include a simple electrical circuit (not shown) to prevent operation of the power source 36 when the handle 40 is in a folded position and is not in a suitable position for operation of the high-efficiency lawn maintenance tool 20. For example, the electrical circuit can include a switch that breaks the electrical connection between the power source 36 and a set of batteries 44 (best seen in FIG. 23). When the electrical connection is broken, the high-efficiency lawn maintenance tool 20 cannot be operated. As such, the switch can be configured to complete the circuit (i.e., enable mower operation) when the handle 40 is in one position or a number of positions that are suitable for mower operation. However, if the handle 40 is outside of the selected position(s), the broken electrical connection will prohibit mower operation, such as when the handle 40 is in the folded position for storage or shipping.

Figure 3:
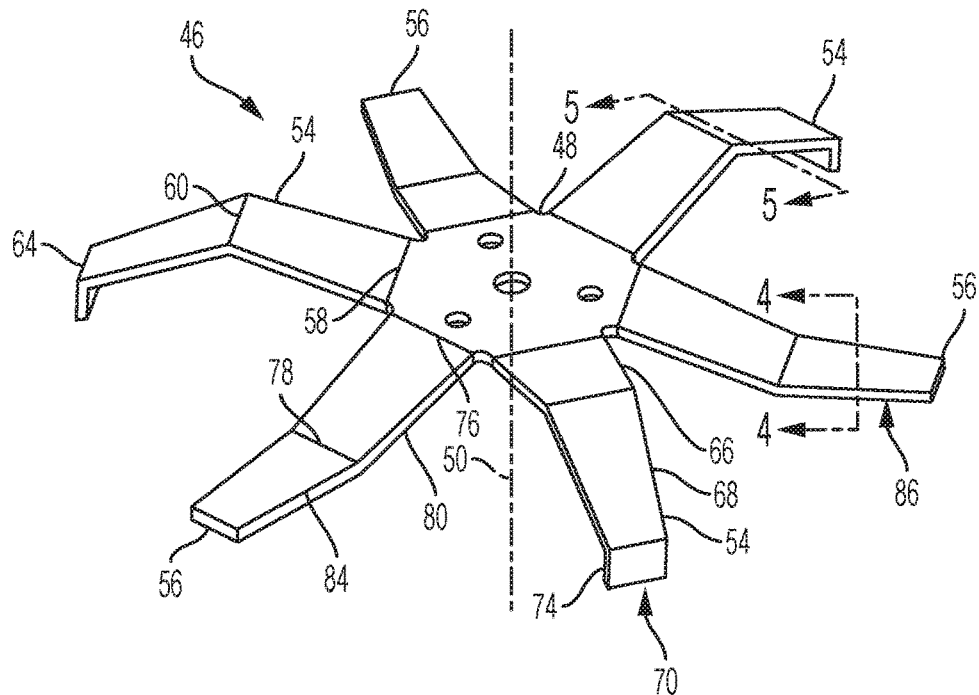
FIG. 3 is a perspective view of a high-efficiency blade that can be used in conjunction with the lawn maintenance tools of FIGS. 1 and 2.

Turning to FIG. 3, an exemplary embodiment of a high-efficiency blade 46 includes a mounting portion 48 centered about a central axis 50. The high-efficiency blade 46 also includes six arms with three lower elevation arms and three higher elevation arms. In this disclosure, the terms higher elevation and lower elevation are terms used to compare distances of the arms from a driven surface, (e.g., the ground or turf). For convenience, the disclosure will use the term "cleaning blade" 54 for each higher elevation arm and the term "cutting blade" 56 for each lower elevation arm.

Each cleaning blade 54 can include three bends 58, 60, 64 which will be described from the center of the high-efficiency blade 46 radially outward. The first bend 58 is adjacent the mounting portion 48 of the high-efficiency blade 46 and the first segment 66 following the first bend 58 extends toward the underside of the deck 30. The second bend 60 leads to the second segment 68 angled slightly downward, where this downward direction maintains the second segment 68 generally parallel to the underside of the deck 30. The third bend 64 is near a tip portion 70 of the cleaning blade 54 after which a third segment 74 extends generally downward. This third bend 64 and third segment 74 are optional for the high-efficiency blade 46 shown in FIG. 3, and can be omitted without significantly affecting the performance of the high-efficiency blade 46. The described geometry of the cleaning blade 54 is but one example, and regardless of the shape and proportions of the cleaning blade 54, it is to be separated a distance from the cutting blade 56 and be positioned at a particular distance from an underside of the mower deck 30 as will be described below.

The example high-efficiency blade 46 of FIG. 3 also shows three cutting blades 56, each cutting blade 56 including two bends 76, 78 and two segments 80, 84 which will be described from the center of the high-efficiency blade 46 radially outward. A first bend 76 leads to a first segment 80 that is angled downward toward the driven surface. A second bend 78 leads to a generally horizontal second segment 84, and the elevation of the second segment 84 corresponds to a desired cut height of the grass/vegetation that is to be cut by the high-efficiency lawn maintenance tool 20. As shown, the cleaning blade 54 and the cutting blade 56 elevations can alternate going around the high-efficiency blade 46, with each cutting blade 56 located between two cleaning blades 54 and each cleaning blade 54 located between two cutting blades 56. However, any suitable number of cleaning blades 54 and cutting blades 56 can be used on the high-efficiency blade 46 provided that the high-efficiency blade 46 is rotationally balanced.

Figure 4:
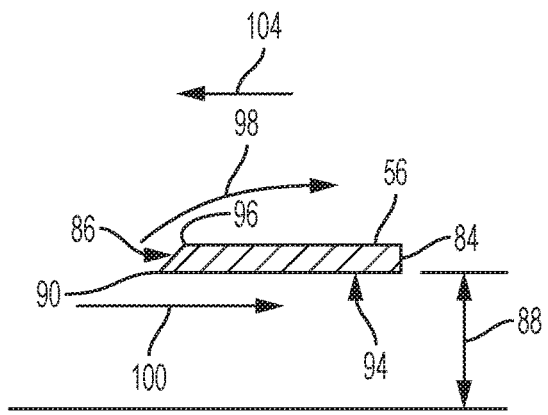
FIG. 4 is a cross-section view of a cutting blade portion of the high-efficiency blade of FIG. 3.

The cutting blade 56 includes cutting blade sharpened leading edges 86 configured to cut grass and/or vegetation as the high-efficiency blade 46 is rotated. As shown in FIG. 4, the cutting blades 56 include cutting blade sharpened leading edges 86 that are located on the second segments 84, again, at an elevation 88 that corresponds to a desired cut height of the grass/vegetation to be cut. It is to be understood that the point 90 of the cutting blade sharpened leading edge 86 is on the lower surface 94 of the second segment 84 to help provide a clean cut of the grass/vegetation. In at least one example, the cutting blade sharpened leading edge 86 is generally parallel to the driven surface. Generally parallel can be within one or two degrees from a horizontal.

Similar to an airfoil, the angled side 96 of the cutting blade sharpened leading edge 86 provides a longer path (represented by arrow 98) for air passing above the second segment 84 than the shorter path (represented by arrow 100) for air passing underneath the second segment 84 as the high-efficiency blade 46 rotates. This creates a lower air pressure zone above the second segment 84 as it rotates through the air in a direction according to arrow 104 and helps extend the grass and/or vegetation for cutting, in addition to helping propel the clippings to the cleaning blades 54.

Figure 5:
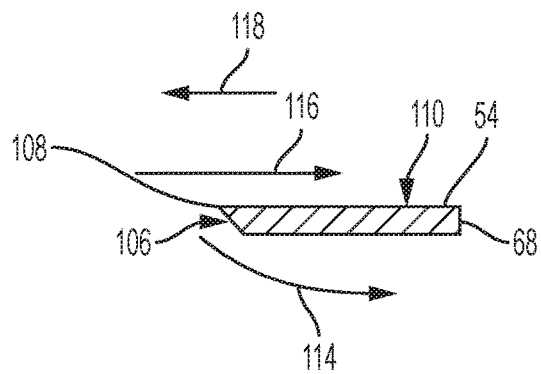
FIG. 5 is a cross-section view of a cleaning blade portion of the high-efficiency blade of FIG. 3.

Turning to FIG. 5, one example of the cleaning blades 54 can also include cleaning blade sharpened leading edges 106. On the cleaning blade second segments 68, the cleaning blade sharpened leading edge 106 can be formed at a reverse angle when compared to the cutting blade sharpened leading edge 86, such that a point 108 of the cleaning blade sharpened leading edge 106 is on an upper surface 110 of the second segment 68. Similar to the cutting blade sharpened leading edge 86, the cleaning blade sharpened leading edge 106 provides a longer path (represented by arrow 114) for air passing underneath the second segment 68 than the shorter path (represented by arrow 116) for air passing above the second segment 68 as the high-efficiency blade 46 rotates. This creates a lower air pressure zone underneath the second segment 68 as it rotates through the air in a direction according to arrow 118 and helps keep the underside of the deck 30 clean, as will be discussed below. Furthermore, the air pressure difference can help move the grass clippings cut again by the cleaning blade second segment 68 to be moved downward, away from the underside of the deck 30.

Figure 6:
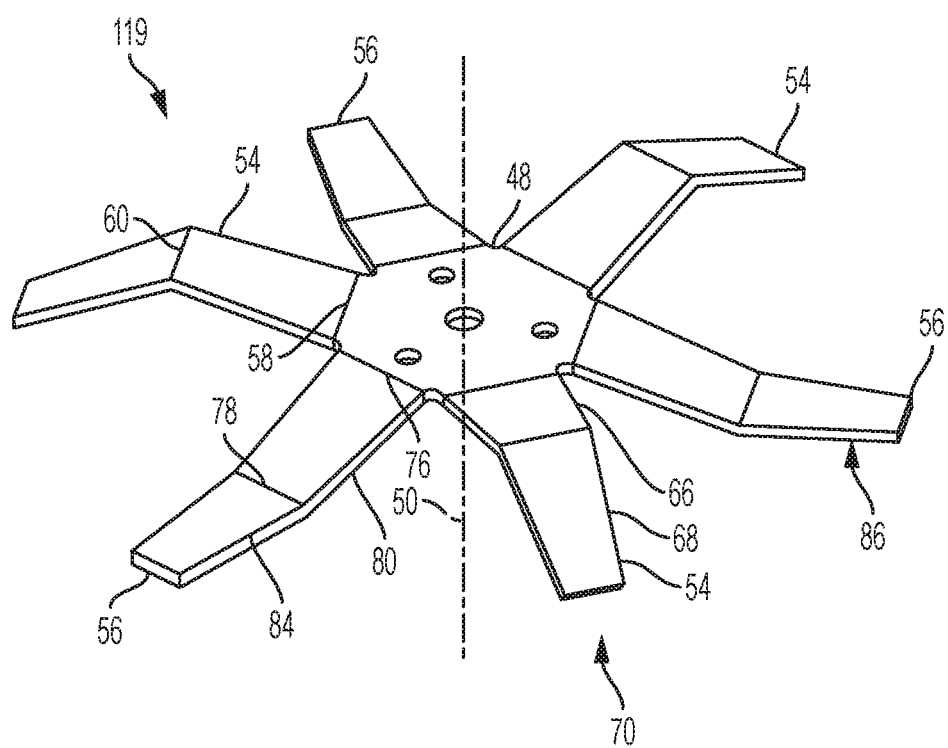
FIG. 6 is similar to FIG. 3, showing a high efficiency blade without a downward pointing third segment.

Turning to FIG. 6, another example of a high-efficiency blade 119 is shown. High-efficiency blade 119 is similar to the high-efficiency blade 46 of FIG. 3, but only includes two segments (first segment 66 and second segment 68) on each cleaning blade 54. In other words, each cleaning blade 54 does not include bend 64 or segment 74. Instead, each cleaning blade 54 terminates at the outer edge of the second segment 68. Elimination of the third segment that extended generally downward can, in some circumstances, reduce the amount of airflow while also eliminating a surface that can undesirably collect grass and/or vegetation clippings.

Figure 7A:
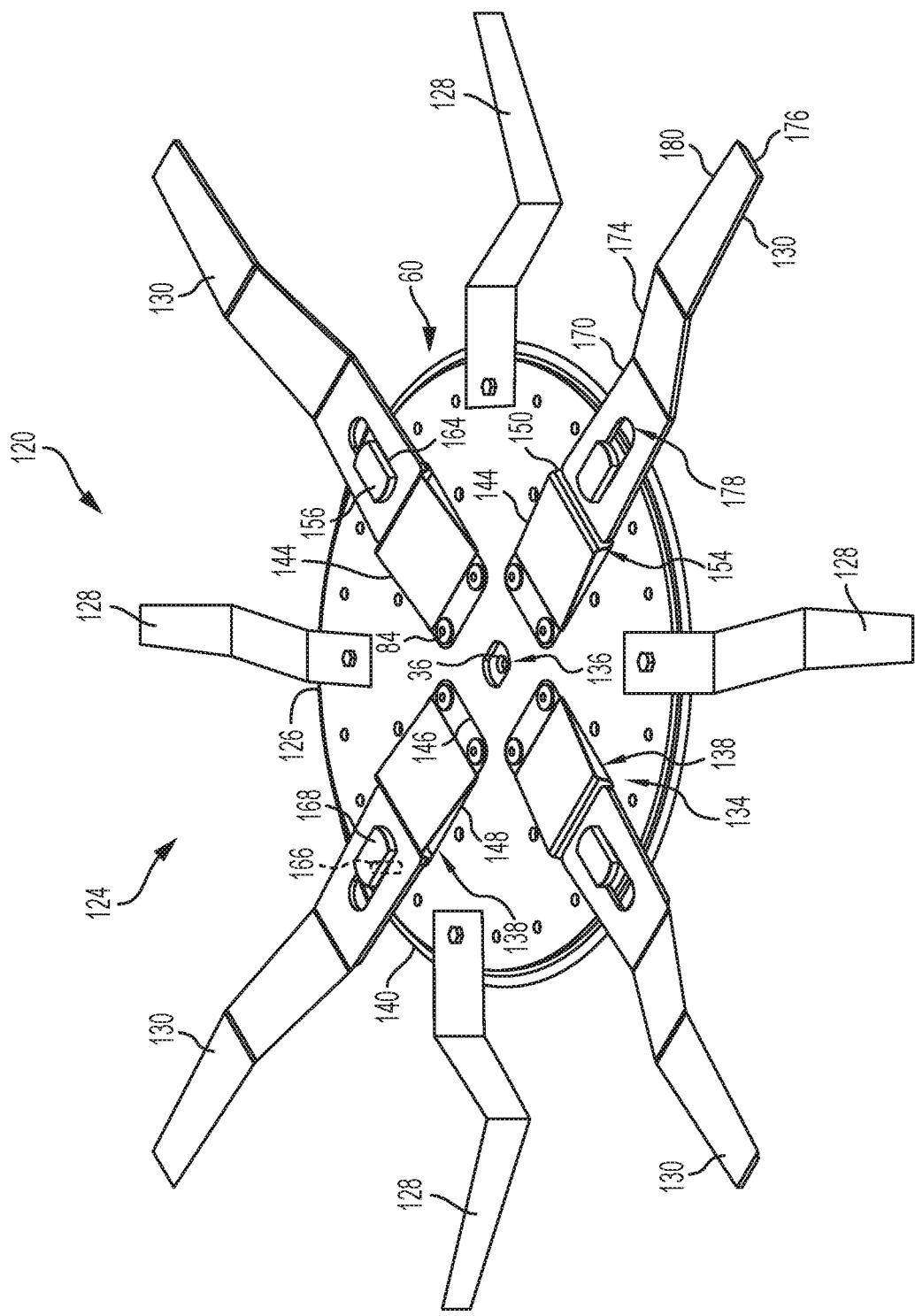
FIG. 7A is a perspective view from a bottom side of another high-efficiency blade that can be used in conjunction with the lawn maintenance tools of FIGS. 1 and 2.

Turning to FIG. 7A, another example of a high-efficiency blade 120 is shown from a bottom side 124. The high-efficiency blade 120 includes a mounting plate 126, a plurality of cleaning blades 128, a plurality of cutting blades 130, and a plurality of quick-attach mechanisms 134 that allow the cutting blades 130 to be easily attached to and detached from the mounting plate 126. The high-efficiency blade 120 is configured to be easily removed and attached as desired to the high-efficiency lawn maintenance tool 20, and the cutting blades 130 are similarly easily removed and attached as desired to the high-efficiency blade 120.

Figure 7B:
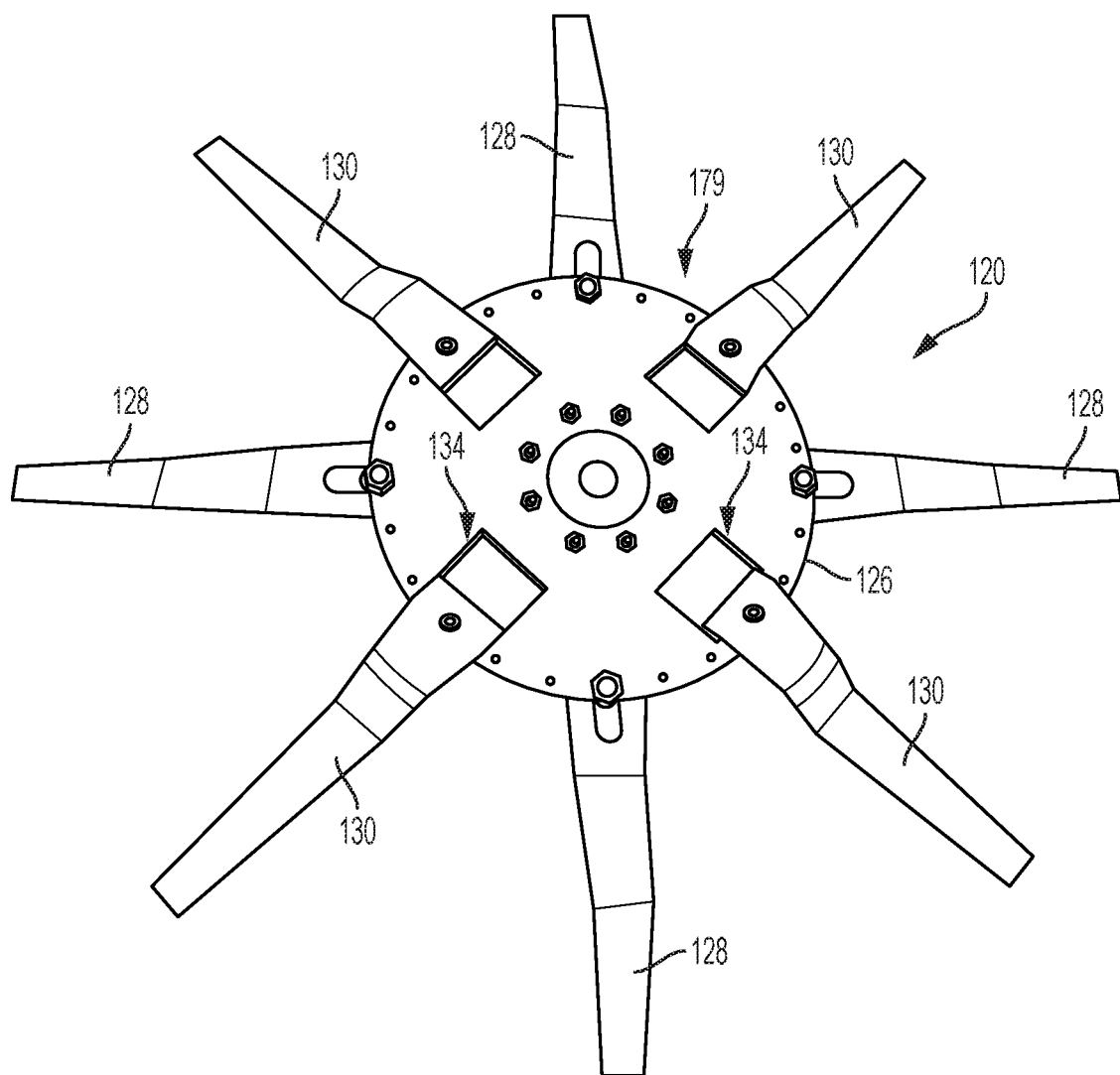
FIG. 7B is similar to FIG. 7A, viewed from a top side of the high-efficiency blade.

The cleaning blades 128, when rotating, form a physical barrier between the cutting blades 130 and the deck 30 as well as between the cut grass and the deck 30, as shown in FIGS. 7A and 7B. The mounting plate 126 is configured to be rotatably driven by a drive shaft 294 (one example is shown in FIG. 8) extending from the power source 36. As described above with other versions of the high-efficiency blade, the cleaning blades 128 are also configured to direct cut grass downwardly toward the ground. The cleaning blades 128 are generally formed such that when rotating, form a volume of revolution as an inverted bowl shape having a somewhat W-shaped configuration, when viewed in the cross-section. When installed on the high-efficiency lawn maintenance tool 20, the open side of the bowl-shaped volume of revolution created by the cleaning blades 128 is directed downwardly toward the ground. The drive shaft 294 that extends downwardly from the power source 36 extends through a central aperture 136 of the mounting plate 126. In the illustrated exemplary embodiment, the mounting plate 126 includes four (4) slots 138 that are equally spaced about the central aperture 136. The slots 138 are oriented in a tangential manner relative to a radial edge 140 of the mounting plate 126, and the slots 138 are positioned about ninety degrees (90°) relative to each other relative to the central aperture 136. The slots 138 are configured to receive a portion of the biasing member of the quick-attach mechanism 134, as explained below.

As shown in FIGS. 7A and 7B, the mounting plate 126 includes a plurality of quick-attach mechanisms 134 that allow for an easy and fast manner for attaching and detaching the cutting blades 130 from the mounting plate 126. The quick-attach mechanisms 134 work in conjunction with a connecting aperture as well as the size and shape of the cutting blades 130 to provide for a tool-less connection between the cutting blades 130 and the mounting plate 126, wherein a tool such as a wrench, screwdriver, or any other handheld tool is not necessary to attach or disconnect the cutting blades 130. In an embodiment, each quick-attach mechanism 134 includes a biasing member 144 operatively connected to the mounting plate 126. The biasing member 144 is configured to bias the cutting blades 130 into being positively attached to the mounting plate 126 when properly attached thereto or, alternatively, to bias the cutting blades 130 away from the mounting plate 126 such that the cutting blades 130 cannot be attached to the mounting plate 126 if the cutting blades 130 are not properly aligned or are not properly connected.

The biasing member 144 is configured as a generally L-shaped spring, as shown in FIG. 7A. In an embodiment, the biasing member 144 is metal, but it should be understood by one having ordinary skill in the art that the biasing member 144 may also be formed of plastic or other flexible material that allows the biasing member 144 to act as a spring. The biasing member 144 includes a base 146, a body 148 extending from the base 146, a curved portion 150, and a bearing portion 154. The base 146 of the biasing member 144 is configured as a substantially flat component and is configured to receive an attachment mechanism 156 for connecting the biasing member 144 to the mounting plate 126. The attachment mechanism 156 can be a nut-and-bolt, rivet, or similar mechanical fastener sufficient to connect the biasing member 144 to the mounting plate 126.

The biasing member 144 is attached to the mounting plate 126 in a cantilevered manner, wherein the distal end of the biasing member 144—defined by the base 146—is attached to the mounting plate 126 and the remainder of the biasing member 144 extends therefrom. The illustrated embodiment shows the base 146 as having two (2) attachment mechanisms 156 for attachment to the mounting plate 126, but it should be understood by one having ordinary skill in the art that the mounting plate 126 may include any number of attachment mechanisms 156. The base 146 is attached to the surface of the mounting plate 126 and extends through a corresponding opening of the mounting plate 126 such that the body 148, curved portion 150, and bearing portion 154 are generally positioned below a downward facing lower surface of the mounting plate 126.

The body 148 of the biasing member 144 of each quick-attach mechanism 134 extends from the base 146 at an angle, as shown in FIG. 7A. The body 148 is a generally flat component that is integrally connected with the base 146. It is the angle formed between the base 146 and the body 148 that provides the spring action when the biasing member 144 is actuated. The body 148 extends downwardly (directionally, when the high-efficiency blade 120 is attached to the lawn maintenance tool 20) below the downward facing lower surface of the mounting plate 126. One distal end of the body 148 is integrally formed with the base 146, and the opposing distal end of the body 148 is integrally formed with the curved portion 150. The curved portion 150 extends from the body 148 in a curved manner, wherein the curved portion 150 is curved upwardly toward the downward facing lower surface 158 of the mounting plate 126. The curved portion 150 connects the body 148 and the bearing portion 154, wherein the bearing portion 154 extends from the curved portion 150 at an angle relative to the body 148. While the body 148 of the biasing member 144 extends away from the downward facing lower surface 86 of the mounting plate 126, the bearing portion 154 extends toward (and beyond) the lower surface 158 of the mounting plate 126. The bearing portion 154 is configured to move into and out of the corresponding slot 138 during actuation of the biasing member 144, as will be explained below. When actuated, the biasing member 144 rotates about the transition between the body 148 and the base 146 such that the bearing portion 154 moves toward the mounting plate 126. The bearing portion 154 includes a bearing surface 160 that is configured to contact the cutting blade 130 and bias the spring either into engagement when properly aligned during attachment or into disengagement when not properly aligned during attachment.

In an embodiment, a cap 164 of the quick-attach mechanism 134 extends downwardly from the downward facing lower surface of the mounting plate 126, as shown in FIG. 7A. Each cap 164 includes a post 166 and a plate 168, wherein the post 166 is attached to the mounting plate 126 and the plate 168 is attached to the opposing distal end of the post 166. The post 166 is a generally cylindrical member that is integrally formed with the mounting plate 126. In an embodiment, the post 166 is attached to the mounting plate 126 by way of a weld or other means for permanently attaching the post 166 to the mounting plate 126. The plate 168 is oriented generally parallel to downward facing lower surface of the mounting plate 126. The plate 168 can be a generally oval-shaped member. Each cap 164 is configured to allow a cutting blade 130 to be releasably attachable thereto. The plate 168 is spaced apart from the mounting plate 126 a distance that is substantially the same as the thickness of the cutting blade 130—or just slightly larger—to reduce or eliminate shaking movement of the cutting blade 130 relative to the mounting plate 126. The plate 168 is sized and shaped to be received by the cutting blade 130.

As shown in FIGS. 7A and 7B, an exemplary embodiment of a cutting blade 130 is a generally elongated Z-shaped blade having a mounting portion 170, a transition portion 174, and a tip portion 176. The mounting portion 170 is formed as a flat portion having an aperture 178 formed therethrough. The aperture 178 is formed as an elongated oval shape, wherein the aperture 178 is shaped to correspond to the shape of the plate 168 of the cap 164. The transition portion 174 extends from the mounting portion 170 at an angle therefrom, wherein the transition portion 174 extends away from the downward facing lower surface of the mounting plate 126. The tip portion 176 extends from the transition portion 174 at an angle thereto, wherein the tip portion 176 and the mounting portion 170 are substantially parallel relative to each other. The cutting blade 130 includes a sharpened leading edge 180xx configure to cut grass as the high-efficiency blade 120 is rotated. When the cutting blades 130 are properly installed on the high-efficiency blade 120, the distal end of the tip portion 176 is positioned adjacent to the radial edge 140 of the revolution of volume formed by the rotating cleaning blades 128. In an embodiment, the distal end of the tip portion 176 is positioned radially inward relative to the radial edge 140 of the revolution of volume formed by the rotating cleaning blades 128.

In operation, the cutting blades 130 are operatively connected to the high-efficiency blade 120 by way of the quick-attach mechanism 134. The cutting blade 130 is first positioned adjacent to the cap 164 of the quick-attach mechanism 134 such that the aperture 178 of the cutting blade is aligned with the cap 164. The cutting blade 130 is then pushed toward the mounting plate 126, wherein the cap 164 of the quick-attach mechanism 134 is received in the aperture 178 of the cutting blade 130. Further, the mounting portion 170 of the cutting blade 130 contacts the body 148 and curved portion 150 of the biasing member 144, and as the cutting blade 130 is moved toward the mounting plate 126, the biasing member 144 is actuated by bending and rotating in a cantilevered manner. If the cutting blade 130 is not fully attached to the cap 164, the biasing member 144 biases the cutting blade 130 away from the mounting plate 126 such that the cutting blade 130 is disengaged from the cap 164. As the biasing member 144 is actuated, the beating portion 154 extends through the corresponding slot 138 of the mounting plate 126. Once the cutting blade 130 has been pushed until it is flush with the mounting plate 126, the cutting blade 130 is then pulled radially toward the radial edge 140 of the mounting plate 126 until the post 166 of the cap 164 contacts the end of the elongated aperture 178 formed through the cutting blade 130. As the cutting blade 130 slides radially outward, the mounting portion 170 of the cutting blade 130 slides along the body 148 and curved portion 150 of the biasing member 144 after which the distal end of the cutting blade 130 slides along the beating surface (downward facing surface) of the bearing portion 154. In this position, the cutting blade 130 is positively attached to the quick-attach mechanism 134 extending from the mounting plate 126, and the swing bias generated at the curved portion 150 of the biasing member 144 continually pushes radially against the edge at distal end of the cutting blade 130. This radial bias from the biasing surface against the cutting blade 130 ensures continuous attachment between the cutting blade 130 and the mounting plate 126. This radial bias also prevents accidental disconnection of the cutting blade 130 by preventing the cutting blade 130 from sliding radially toward the central aperture 136 of the mounting plate 126. The mounting portion 170 of the cutting blade 130 is sandwiched between a portion of the cap 164 and the mounting plate 126 to reduce or eliminate any "bounce" at the distal end of the tip portion 176.

The cutting blade 130 is removed by actuating—or pressing—the biasing member 144 toward the mounting plate 126, thereby removing the radial bearing force applied to the cutting blade 130 and effectively disengaging the cutting blade 130 from the biasing member 144. The cutting blade 130 is then slid radially inward toward the central aperture 136 of the mounting plate 126 until the entire plate 168 of the cap 164 is aligned with the aperture 178 of the cutting blade 130. At this point, the cutting blade 130 can be removed from the quick-attach mechanism 134.

As noted previously, the quick-attach mechanism 134 allows the cutting blades 130 to be releasably attachable to the mounting plate 126 without the use of any handheld tools or other tool separate from the high-efficiency blade 120.

Turning to FIG. 7B, the high-efficiency blade 120 is shown from a top side 179. The high-efficiency blade 120 includes a mounting plate 126, a plurality of cleaning blades 128, a plurality of cutting blades 130, and a plurality of quick-attach mechanisms 134 that allow the cutting blades 130 to be easily attached to and detached from the mounting plate 126. The high-efficiency blade 120 can be configured to be easily removed and attached as desired to the high-efficiency lawn maintenance tool 20, and the cutting blades 130 are similarly easily removed and attached as desired to the high-efficiency blade 120.

Turning to FIG. 8, regardless of the number of bends 58, 60, 64 or segments 66, 68, 74 in any of the example cleaning blade 54, 128, at least one segment of the cleaning blade 54, 128 is generally parallel to the underside of the deck 30. This same segment is maintained at a relatively close distance from the underside of the deck 30 as represented by dimension 180 in FIG. 8. In the shown example, the second segment 68 is located about one-inch to 1/16-inch from the underside of the deck 30. In a more particular example, the second segment 68 is located about 1/2-inch to 1/16-inch from the underside of the deck 30. In yet a more particular example, the second segment 68 is located about 1/4-inch to 1/16-inch from the underside of the deck 30. The dimension 180 can be optimized to encourage optimal mulching of the grass clippings and improved cleanliness of the underside of the deck 30. One factor in the optimization process can be the rotational speed of the high-efficiency blade 46, 120. In one example, as the rotational speed of the high-efficiency blade 46, 120 is reduced, the optimized dimension 180 is also reduced.

Another goal of the cleaning blades 54 is to reduce and/or eliminate buildup of grass clippings on the underside of the deck 30. This cleaning function can be accomplished in at least three ways by the cleaning blades 54. First, the cleaning blades 54 can knock the grass clippings downward toward the turf/driven surface as the cleaning blade 54 strikes the grass clipping after it is propelled upward by the cutting blade 56 during the cutting function. This action of knocking down the grass clippings can prevent the grass clippings contacting the underside of the deck 30 and then sticking to the underside of the deck 30. Second, the cleaning blades 54 can direct the grass clippings and an airflow in a direction radially away from the central axis 50. This outward flow can also help reduce and/or eliminate attachment of grass clippings to the underside of the deck 30. Third, the close proximity of the cleaning blade segment 68 to the underside of the deck 30 can affect the air pressure in the boundary layer of air adjacent the underside of the deck 30. For example, as the cleaning blade segment 68 close to the underside of the deck 30 approaches a particular point on the underside of the deck 30, the segment 68 is pushing a wave of air. This causes an increase in the air pressure about the particular point. As the segment 68 passes, the air pressure is reduced, thereby creating a sinusoidal effect in the air pressure about any given point on the underside of the deck 30. This variable pressure wave, or periodic pressure increase and decrease, which has a relatively high frequency due to the rotational speed of the high-efficiency blade 46, reduces the likelihood of grass clippings becoming attached to or stuck to the underside of the deck 30.

As a brief summary, each of these functions enables the cleaning blades 54 to replicate the effects of a solid disk rotating in unison with the cutting blades 56. After grass blades or other vegetation are cut by the cutting blades 56, the clippings are typically propelled in the air for a time, during which time the cleaning blades 54 strike and cut the grass clippings one or more times. Impact with the cleaning blades 54 tends to urge the grass clippings radially outward from the central axis 50 and downward toward the turf. The periodic pressure change in the volume of air adjacent the underside of the deck 30 further aids in reducing and/or eliminating grass clipping build-up on the underside of the deck 30. In this way, the high-efficiency blade enables the high-efficiency lawn maintenance tool 20 to become a self-cleaning device.

Figure 9:
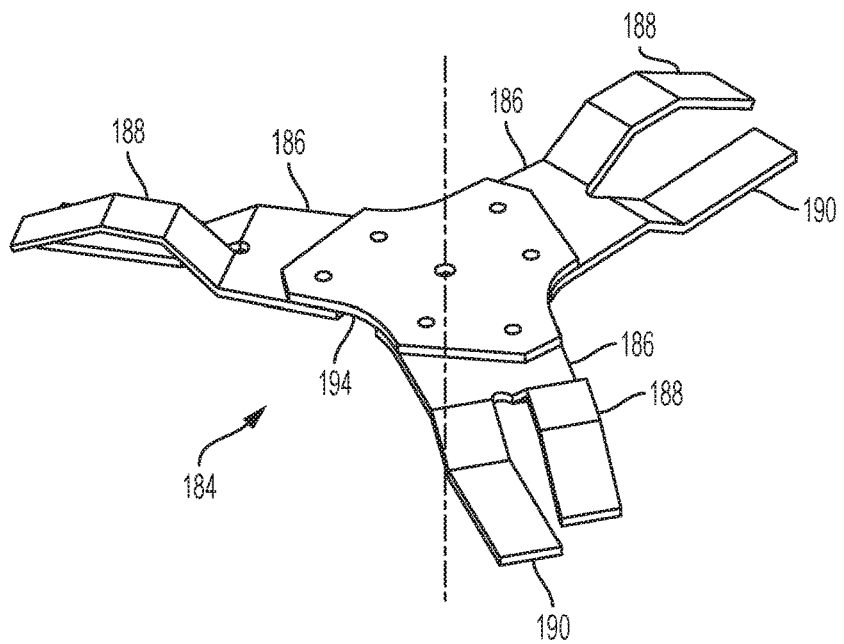
FIG. 9 is a cross-section view of another embodiment of a high-efficiency blade that can be used in conjunction with the lawn maintenance tools of FIGS. 1 and 2.

Turning to FIG. 9, another example of a high-efficiency blade 184 is shown, and it is to be appreciated that any number of structures including cleaning blades with sharpened edges and cutting blades having sharpened edges are contemplated. The version of the high-efficiency blade 184 shown in FIG. 9 includes three arm sections 186 with each arm section including a cleaning blade 188 and a cutting blade 190. The high-efficiency blade 184 of FIG. 9 can include a mounting portion 194 providing a mounting location for each of the three arm sections 186. Each of the three arm sections 186 can be mounted to the mounting portion 194 by any suitable structure or method. Similar to the high-efficiency blade 46 of FIG. 3, the high-efficiency blade 184 of FIG. 9 includes cutting blades 190 configured to cut grass and/or other vegetation while the cleaning blades 188 are configured to mulch the clippings and keep the underside of the deck 30 relatively free and/or completely free of an accumulation of clippings.

Figure 10:
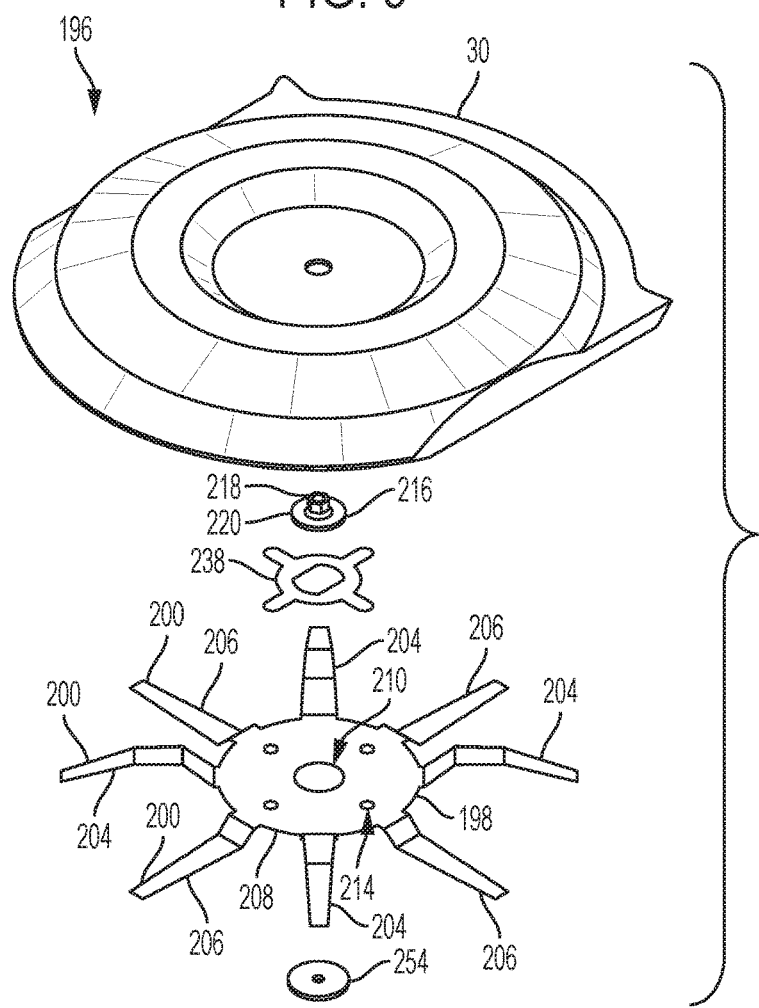
FIG. 10 is an exploded view of a high-efficiency blade system assembly including another embodiment of a high-efficiency blade.
Figure 11:
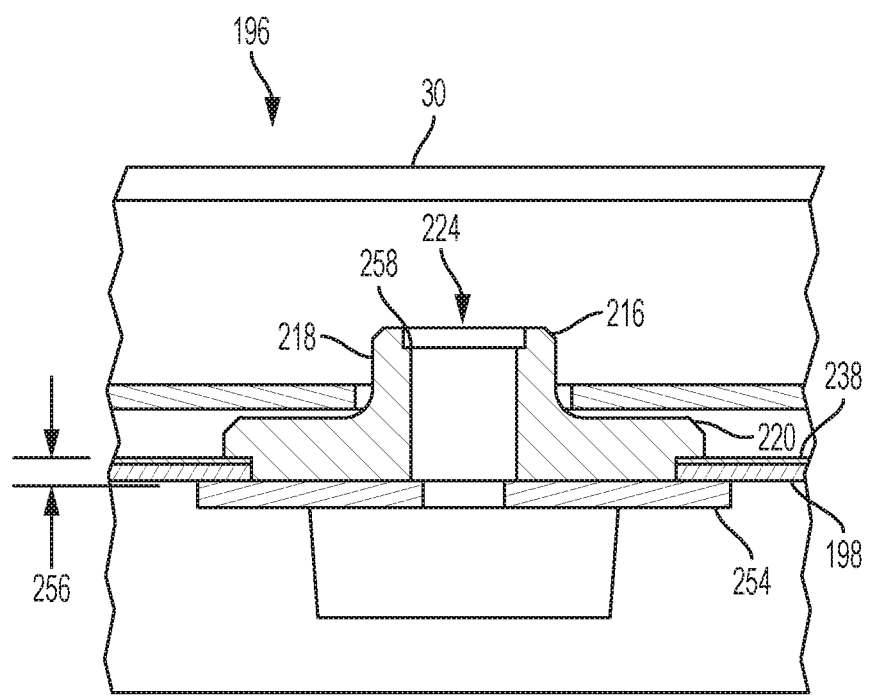
FIG. 11 is a cross-section view of the assembled components of FIG. 10.
Figure 12:
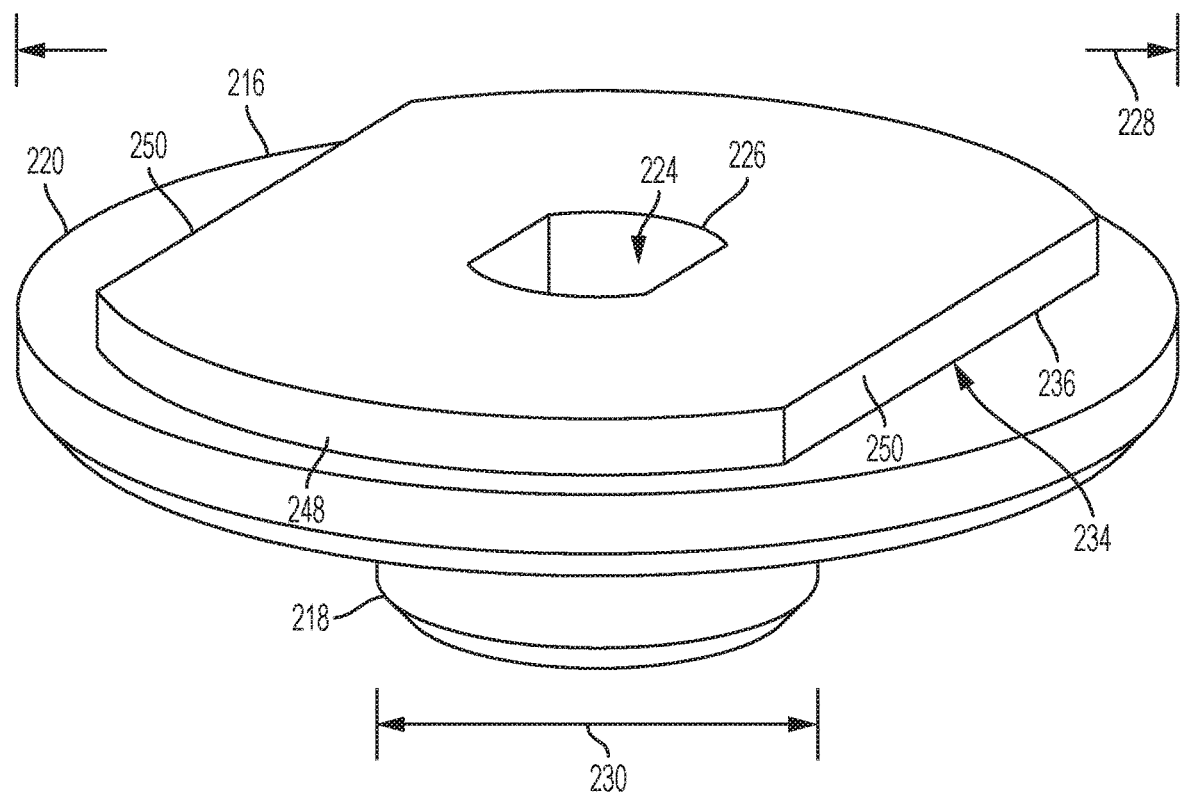
FIG. 12 is a detail view of a motor mount used in the assembly of FIGS. 10 and 11.
Figure 13:
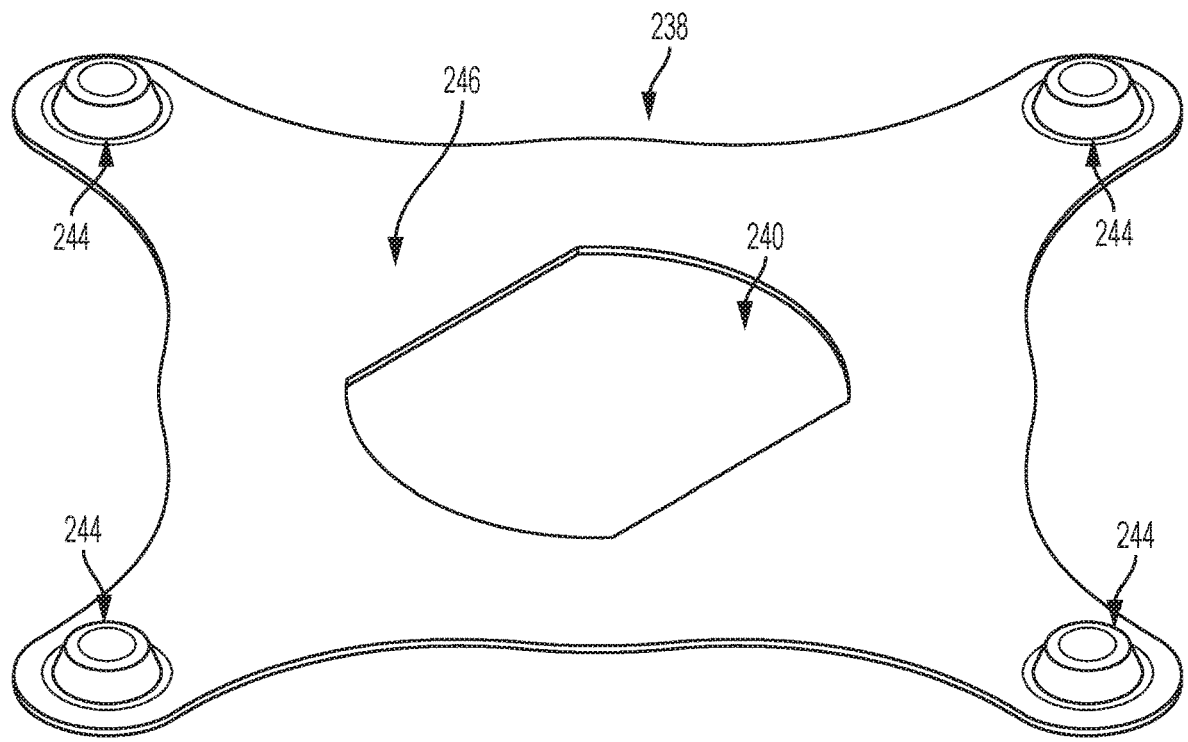
FIG. 13 is a detail view of a leaf spring used in the assembly of FIGS. 10 and 11.

Turning to FIG. 10, an exploded view of a mounting assembly 196 for another example high-efficiency blade 198 is shown. While any suitable mounting structure for the high-efficiency blade 198 is acceptable, the mounting assembly 196 shown in FIG. 10 provides one example. The mounting assembly 196 mounts to the spindle or motor shaft (not shown) of the power source 36 (e.g., electric motor, internal combustion engine, etc.) to mount the high-efficiency blade 198 to the spindle or shaft while eliminating relative motion between the high-efficiency blade 198 and the spindle or shaft. FIG. 11 shows an assembled view of the components of FIG. 10, and FIGS. 12 and 13 show detail views of two of the mounting assembly 196 components. FIGS. 11-13 may assist the understanding of the mounting assembly if these additional figures are referenced together with FIG. 10.

The high-efficiency blade 198 configuration of FIG. 10 includes eight arms 200; four cleaning blades 204 and four cutting blades 206 emanating from a central mounting portion 208. Like the previously described high-efficiency blades 46, 120 the arm type alternates around the exterior of the central mounting portion 208. In other words, each cleaning blade 204 is located between two cutting blades 206, and each cutting blade 206 is located between two cleaning blades 204. The mounting portion 208 defines a central aperture 210 and a plurality of drive apertures 214 located on a circle having a greater diameter than the central aperture 210.

An example mower deck 30 is shown at the top of FIG. 10. Directly underneath the deck 30, a motor mount 216 is shown that includes a stem portion 218 and a flat, disk portion 220. As shown in FIG. 12, the motor mount 216 defines a central through-hole 224 configured to cooperate with a portion of the spindle or shaft. In one example, the through-hole 224 includes a non-circular cross-sectional profile 226 which can include, but is not limited to a "Double-D" shape. The through-hole 224 is configured to cooperate with a similar, reverse shape on the spindle or shaft and fit snugly to the spindle or shaft. FIG. 12 shows the motor mount 216 upside-down from its normal orientation in the mounting assembly 196 in order to better show particular features. The disk portion 220 of the motor mount 214 has a greater diameter 228 than a diameter 230 of the stem portion 218. The disk portion 220 also includes a stepped area 234 that is notable for a non-circular shape 236, such as a Double-D shape.

Returning to FIG. 10, a leaf spring 238 is located directly below the motor mount 216. The leaf spring 238 detail is shown in FIG. 13, and is also shown upside down relative to its normal orientation in the mounting assembly 196. The leaf spring 238 defines a central aperture 240 having a non-circular shape, such as a Double D shape to eliminate relative movement between the leaf spring 238 and the motor mount 216. The leaf spring 238 includes a plurality of drive knobs 244 located on a downward-facing side 246, or the side adjacent the high-efficiency blade 198. It is to be understood that the circular portion 248 of the stepped area 234 Double D of the motor mount 216 can pilot the central aperture 210 of the high-efficiency blade 198 while the flat portions 250 of the Double D arrangement can pilot the central aperture 240 of the leaf spring 238. The drive knobs 244 are located on a circle of the same diameter as the drive apertures 214 on the high-efficiency blade 198 of FIG. 10. The drive knobs 244 are configured to cooperate with the drive apertures 214 to pass rotational power from the spindle or shaft, the motor mount 216, and the leaf spring 238 to the high-efficiency blade 198.

As shown in FIG. 10, a washer 254 is located beneath the high-efficiency blade 198, and a fastener (e.g., a threaded fastener) (not shown) is used to secure the mounting assembly 196 to the spindle or shaft. As shown in FIG. 11, the leaf spring 238 and the high-efficiency blade 198 are sandwiched between the motor mount 216 and the washer 254. The mounting assembly 196 can be maintained in this position by a screw (not shown) that threads into a female threaded portion of the spindle or shaft. The female threaded portion is coaxial with the spindle or shaft.

The disk portion 220 of the motor mount 216 and the washer 254 form a gap (shown by dimension 256) in the mounting assembly 196 that can be a bit longer than the sum of the heights of the high-efficiency blade 198 and the leaf spring 238. This extra distance helps ensure that the rotational force for the high-efficiency blade 198 is provided at the drive knobs 244 and drive apertures 214 rather than relying on a clamping force between the washer 254 and the motor mount 216. This arrangement is intended to enable the high-efficiency blade 198 to rotate to cut grass and vegetation, but when striking a firm object (e.g., a pipe or a rock), the high-efficiency blade 198 may slip free of the rotation restraint provided by the leaf spring 238. This free rotation condition is intended to prevent significant twisting and or bending moments that may damage the high-efficiency blade 198 and the deck 30.

As can be seen in FIG. 11, the stem portion 218 of the motor mount 216 can also define a shoulder 258 in the through-hole 224. This shoulder 258 can cooperate with a shoulder (not shown) on the spindle or shaft to positively locate the mounting assembly 196.

There are several aspects of the example high-efficiency blades and the high-efficiency lawn maintenance tool 20 that render them to be "high-efficiency." First, many known mower blades include a "ramp" or "sail" located at the trailing edge of a rotating blade. The sail is placed on the blade to generate considerable airflow beneath the standard mower deck. This airflow can be effective to: a) pull blades of grass upward in order to be cut by the rotating blade and b) move grass clippings toward and through a chute opening defined by the deck. Approximately 50% of all the power required to drive a conventional cutting system is used to generate this airflow.

However, the described cutting system provides a 50% reduction in airflow as actually measured when compared to standard internal combustion engine mowers with a standard rotating cutting blade having a sail. The same 50% reduction in airflow is measured when the device of the present disclosure is compared to electrically-operated mowers employing a typical cutting blade.

Additionally, it is worthy of note that for moving objects (e.g., a rotating mower blade), measured air resistance is a square function of the velocity of the rotating object. In the disclosed high-efficiency blade, there are four (4) grass cutting edges compared to two (2) cutting edges on a standard mower blade. With at least double the number of cutting blades, the described cutting devices can operate at a reduced revolutions per minute (rpm) when compared to typical mower blades. Thus, the reduction in rpm operation reduces the power requirement of the blade. For example, an rpm reduction by half would result in ¼ of resultant air resistance due to the square function relationship between velocity and air resistance.

As such, the high-efficiency blades described in this disclosure both reduce the total requirement for airflow generation and reduce the overall air resistance as the high-efficiency blade rotates through the air, the blade is significantly more efficient that a typical mower blade. This greater efficiency results in a reduced power requirement from a power source leading to increased run times for battery-operated mowers, increased fuel efficiency for internal combustion engine-operated mowers, or decreased demand for electrical draw from a corded, electrically-operated mower. For example, if the power consumption of the described devices are half of the power consumption of typical mowers, then the run time of the battery-operated mower is twice that of the typical battery-operated mower. In other words, a 50% increase in efficiency for a battery-operated mower results in 50% longer run time on the same battery or battery system.

The remainder of the disclosure will refer to only one high-efficiency blade 46, however, it is understood that several versions of a high-efficiency blade can be used in the described high-efficiency lawn maintenance tool 20.

Figure 14:
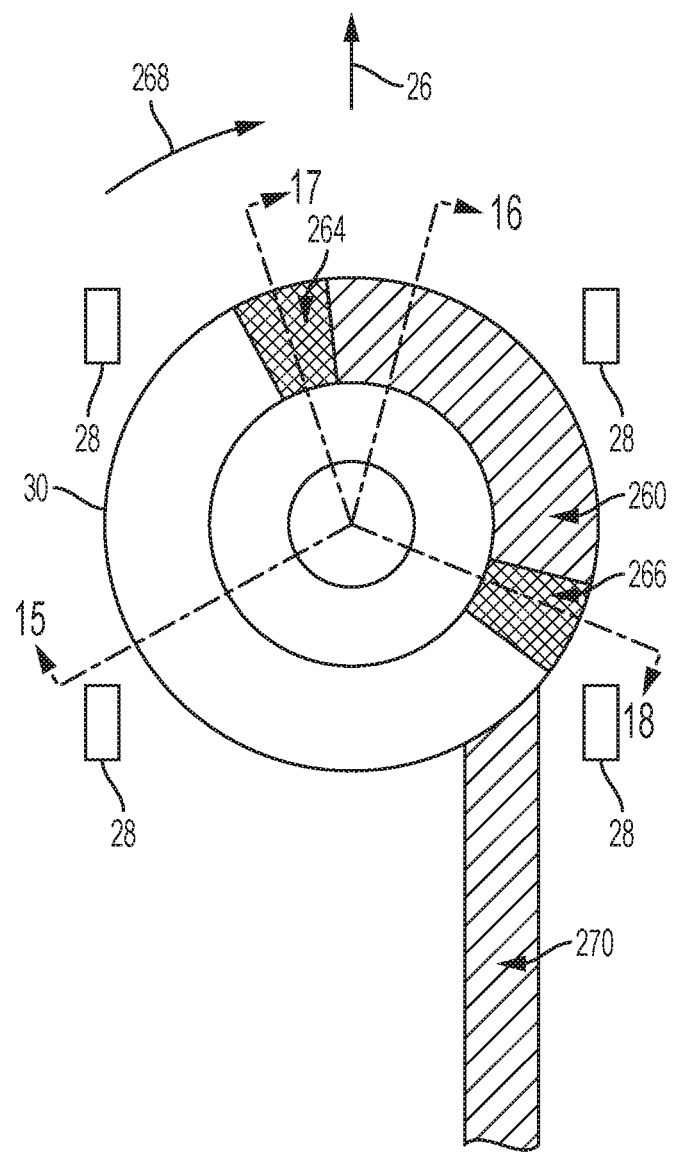
FIG. 14 is a schematic view of a lawn mower deck showing an area of greater separation distance between the cleaning blade and an underside of the deck.

In some examples of lawn maintenance tools including a high-efficiency blade 46, it may be advantageous to alter the separation distance between the cleaning blade 54 of the high-efficiency blade 46 and the underside of the deck 30 as represented by dimension 180 in FIG. 8. Turning to FIG. 14, a top view of an example deck 30 is shown including three shaded areas 260, 264, 266. Each of the shaded areas 260, 264, 266 includes a separation distance between the cleaning blade 54 and the underside of the deck 30 that is different from the separation distance 180 provided in the non-shaded portions of the deck 30. As the high-efficiency blade (not shown) turns in a direction represented by arrow 268, a significant accumulation of grass clippings may collect and be forced down into the turf grass in a particular linear arrangement, leaving a path of bent-over grass represented by area 270.

Figure 15:
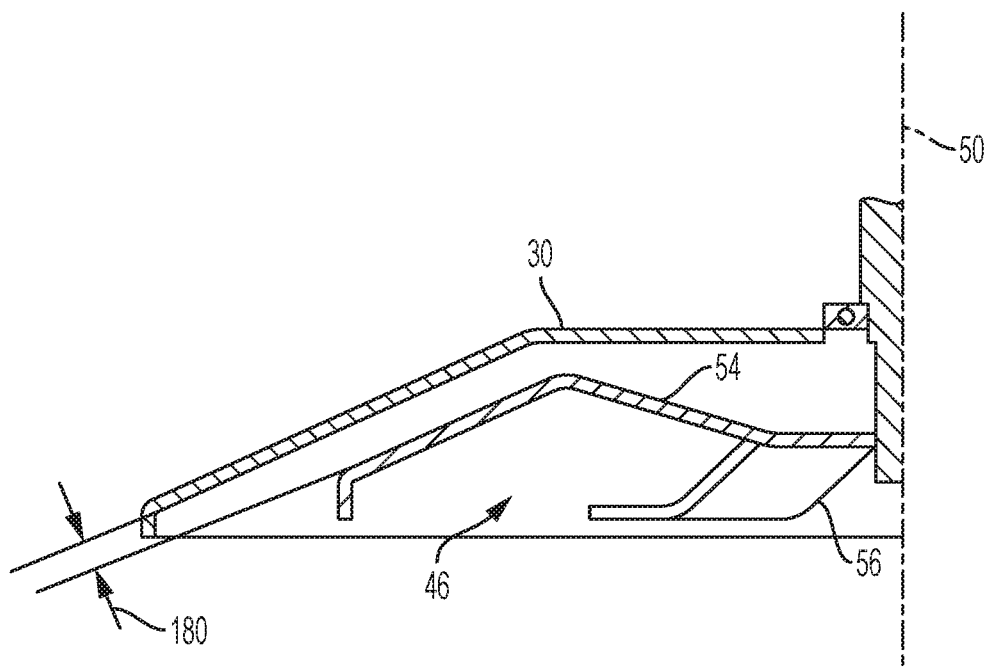
FIG. 15 is a cross-section view taken along line 15-15 of FIG. 14 showing a typical separation distance between the cleaning blade and the deck.
Figure 16:
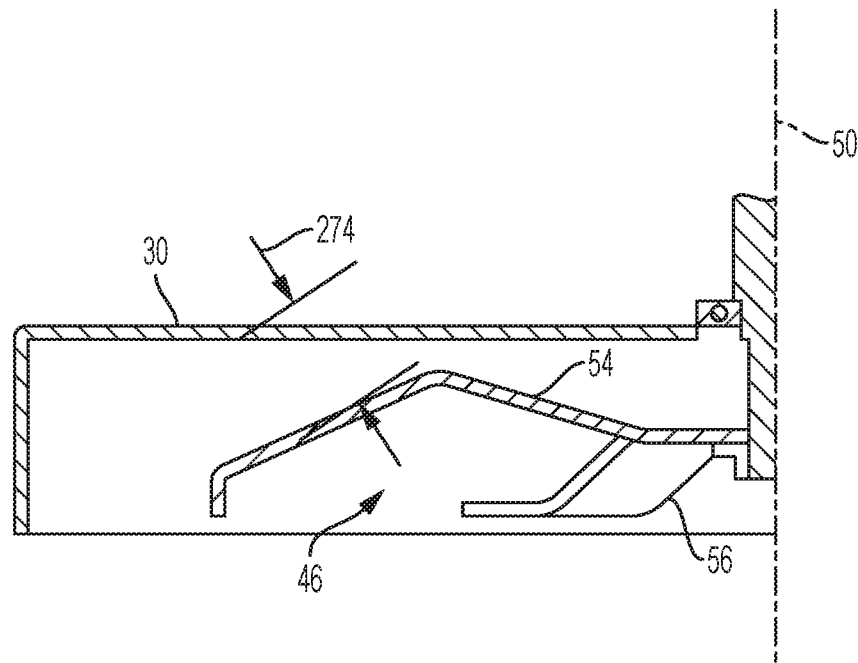
FIG. 16 is a cross-section view taken along line 16-16 of FIG. 14 showing an increased separation distance between the cleaning blade and the deck.
Figure 17:
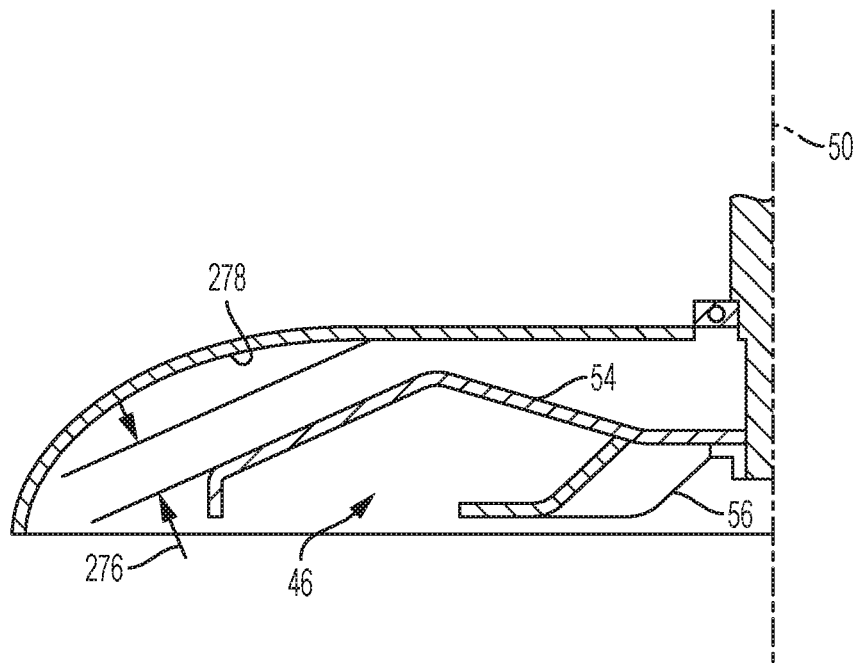
FIG. 17 is a cross-section view taken along line 17-17 of FIG. 14 showing a transition separation distance between the cleaning blade and the deck.

The cross-section view of FIG. 15 shows the standard separation distance 180, which is the same as that shown in FIG. 8. FIG. 16 shows an increased separation distance 274 in one portion of the deck 30. In other words, the separation distance 274 is increased in this area 260 due to a deeper draw on that portion of the deck 30. The deck height in this area 260 can be constant and generally parallel to the driven surface (e.g., the turf), however, any suitable arrangement is acceptable. The cross-section view of FIG. 17 represents an area 264 of increasing separation distance 276, and serves as a transition area 264 from the part of the deck 30 having a typical separation distance 180 to the part of the deck 30 having the increased separation distance 274 shown in FIG. 16. The transition surface 278 may be of any suitable arrangement, such as ones having a linear profile similar to a ramp, or curvilinear, etc.

Figure 18:
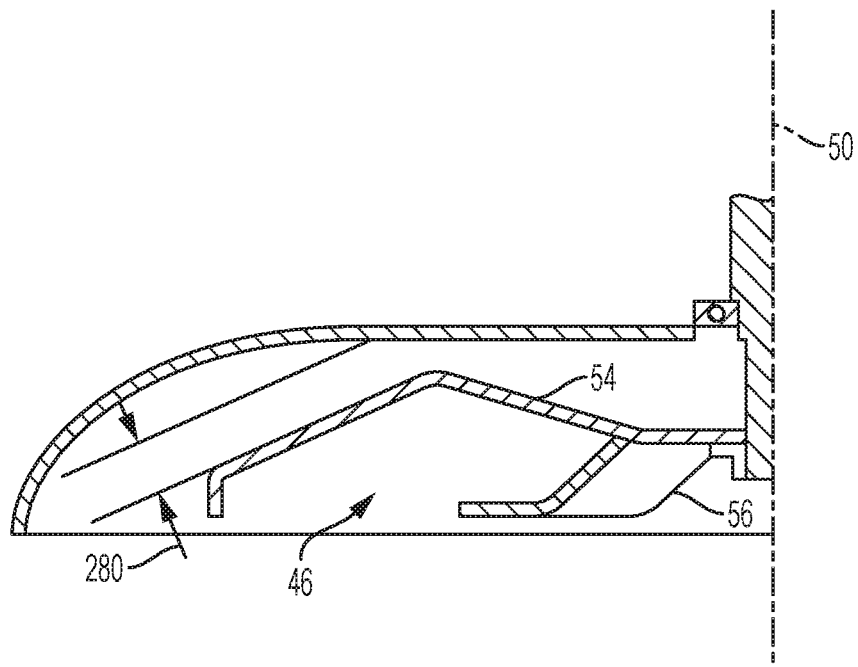
FIG. 18 is similar to FIG. 17 and is a cross-section view taken along line 16-16 of FIG. 14 showing a transition separation distance between the cleaning blade and the deck.

The cross-section view of FIG. 18 shows another transition area 266 in which the separation distance 280 decreases from the separation distance 274 of FIG. 16 to the typical separation distance 180 of the remainder of the deck 30 shown in FIG. 15. The cross-section of FIG. 18 can be identical to the cross-section of FIG. 17, save that the separation distance 280 is increasing as the cleaning blade 54 rotates in the clockwise direction in FIG. 17, and decreasing as the cleaning blade 54 rotates in the clockwise direction in FIG. 18. Again, any suitable profile for the deck transition height is acceptable, including ramps, curvilinear surfaces, etc.

Returning to FIG. 14, these areas 260, 264, 266 of the deck 30 having a greater separation distance can accommodate relatively large accumulations of grass clippings while reducing and/or eliminating patterns of bent-over grass arising from the relatively large accumulations. There are a number of factors that can alleviate the bent-over grass condition, including a larger volume of space for the grass clippings to occupy, thereby some clippings require a longer path and longer time period to return to the turf below, spreading the distribution of mulched grass over a wider area. Additionally, the cleaning blade 54 of the high-efficiency blade 46 can strike the grass clippings a number of additional times, thereby creating smaller clippings that will have a decreased tendency to bend the uncut grass.

Figure 19:
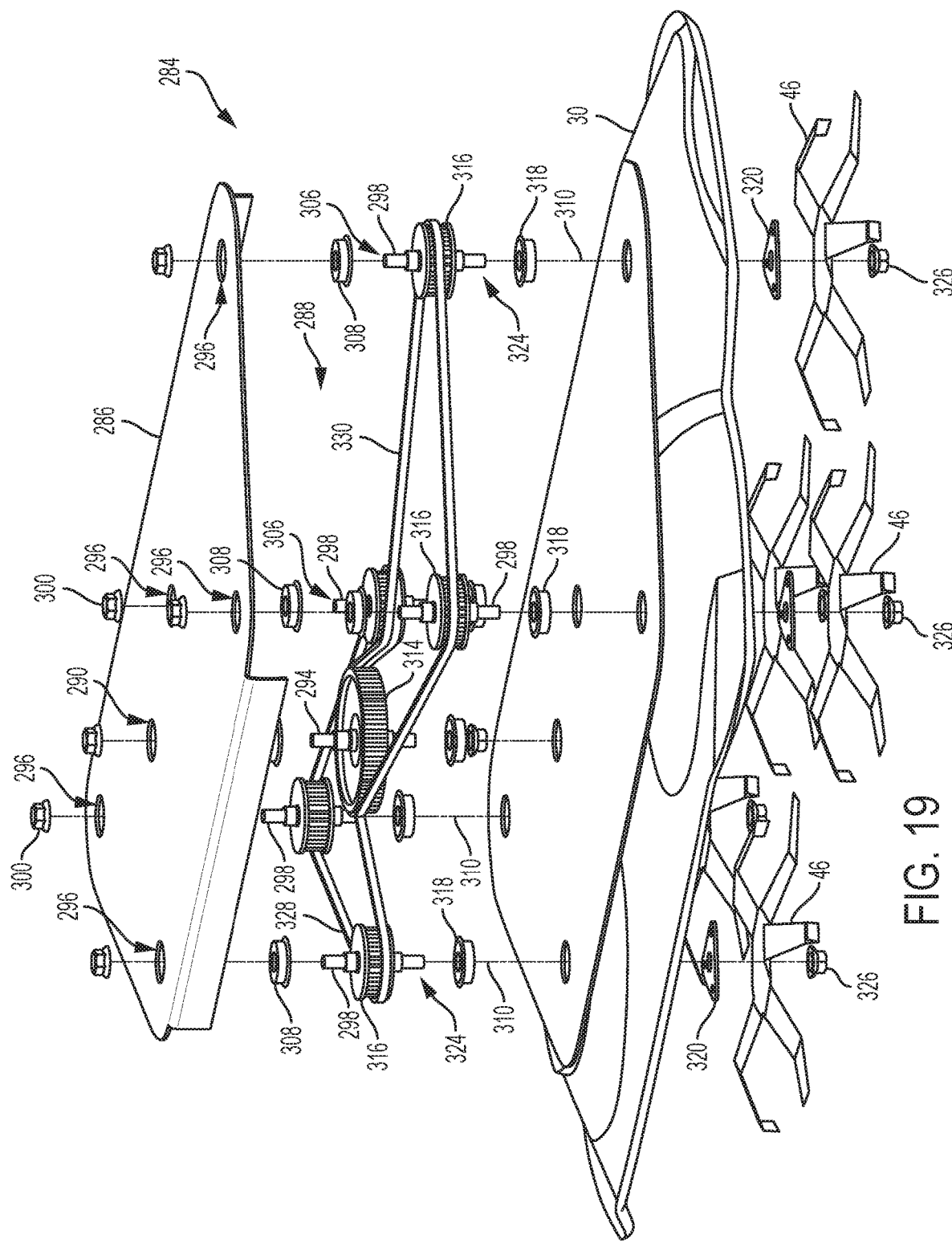
FIG. 19 is an exploded view of a high-efficiency blade assembly for a five-spindle high-efficiency lawn maintenance tool.

To this point, the disclosure has primarily discussed single-spindle lawn maintenance tools, such as those shown in FIGS. 1 and 2. It is to be understood that the design of the high-efficiency lawn maintenance tool 20 can be scalable to larger or smaller needs. For example, a larger walk-behind mower or a riding mower may require a larger single high-efficiency blade. Alternatively, the high-efficiency lawn maintenance tool 20 can also include a plurality of high-efficiency blades 46 of any scalable size. For example, FIG. 19 shows an exploded view of an example mounting assembly 284 for a plurality of high-efficiency blades 46 for a multi-spindle high-efficiency lawn maintenance tool 20, more specifically, a five-spindle high-efficiency lawn maintenance tool.

The mounting assembly 284 of the high-efficiency blade 46 for a multi-spindle high-efficiency lawn maintenance tool 46 can include a belt cover 286 that cooperates with a deck 30 to enclose several high-efficiency blade drive components of the mounting assembly 284 within an interior space 288. The belt cover 286 can be attached to the deck 30 in any number of suitable arrangements and fasteners are not shown in FIG. 19. The belt cover 286 defines one aperture 290 coinciding with a drive spindle 294 and five apertures 296 coinciding one each to the five driven spindles 298. The apertures 290, 296 are configured to enable passage of a portion of each spindle 294, 298 through the belt cover 286 where a threaded fastener 300 can help ensure proper mounting and location of the spindles 294, 298. In one example, the belt cover 286 and the deck 30 can be configured to mate such that accumulations of dirt and other unwanted particles are minimized and/or eliminated from the interior space 288. In some examples, there may be a belt cover bottom 304 (best seen in FIG. 8) between the deck 30 and the drive components that is configured to interact with the belt cover 286 to help seal the interior space 288 for the drive components.

Moving from the top down, each spindle 294, 298 includes the aforementioned threaded fastener 300 (e.g., a threaded nut) at the top that can cooperate with a threaded end 306 of the spindle 294, 298. Each spindle 294, 298 passes through a cover bearing 308 to provide a suitable axis of rotation 310 for the spindle 294, 298. The cover bearings 308 can be captured by the belt cover 286 as shown in in the cross-section view of FIG. 8. Returning to FIG. 19, the drive spindle 294 passes through a drive pulley 314 or gear. Similarly, the driven spindle 298 passes through a driven pulley 316. The spindle 294, 298 may be molded into the pulley 314, 316, press-fit into the pulley 314, 316 or attached in any other suitable manner. The pulleys 314, 316 are cogged in order to provide a timing function with respect to each of the other pulleys 314, 316. The spindle 294, 298 then passes through a deck bearing 318 that is configured to be captured by the deck 30 as shown in FIG. 8. Returning to FIG. 19, after the driven spindles 298 pass through the deck 30, a high-efficiency blade attachment member 320 rotationally fixes the high-efficiency blade 46 to the driven spindle 298. At a lower end 324 of the driven spindle 298, the high-efficiency blade 46 is vertically fixed to the driven spindle 298 by a fastener 326 (e.g., a threaded nut) that cooperates with the lower end 324 of the driven spindle 298.

In the shown example, the drive spindle 294 can have minor variations from the driven spindles 298. For example, the drive spindle 294 can be longer in order to provide a connection to a suitable rotational power source. In another example, the drive spindle 294 can be the drive shaft of an electric motor or an internal combustion engine.

The drive components within the interior space 288 further include at least one drive belt 328 configured to transfer rotational power from the drive spindle 294 to the driven spindles 298. In the shown example, there are two serpentine drive belts 328, 330 that are cogged on both sides of the drive belt 328, 330. Belt teeth are not shown in FIG. 19 in order to minimize the complexity of the drawing.

Figure 20:
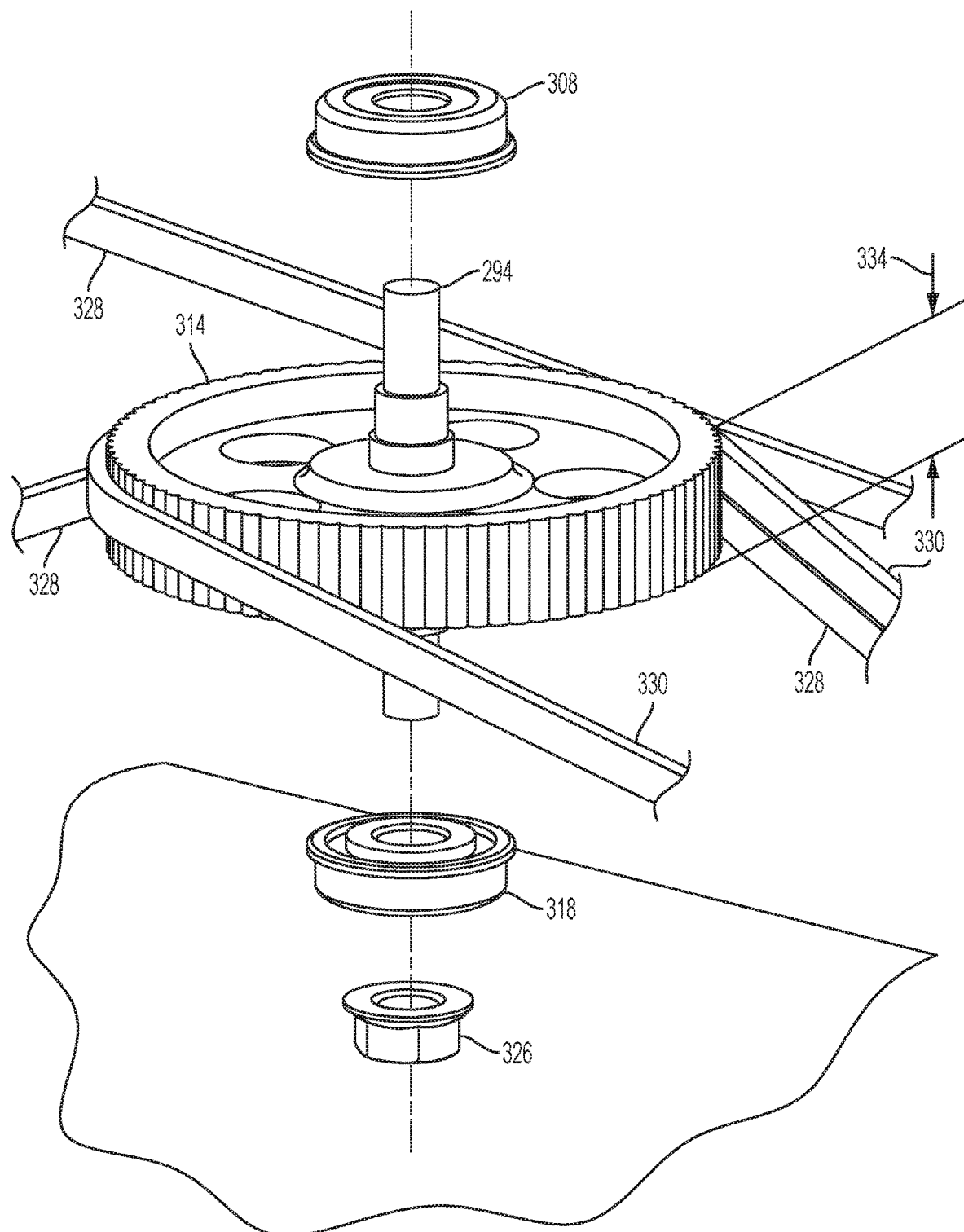
FIG. 20 is an exploded view of a drive spindle and drive gear from the assembly of FIG. 19.

Turning to FIG. 20, each of the drive pulley 314 and the driven pulleys 316 include a suitable height dimension 334 such that both drive belts 328, 330 can interact with any given pulley 314, 316 simultaneously, each drive belt 328, 330 interacting with the teeth of the pulley 314, 316 at a separate elevation. This detail view of the drive spindle 294 and the drive pulley 314 shows the simultaneous interaction of the two drive belts 328, 330 with the single drive pulley 314.

Figure 21:
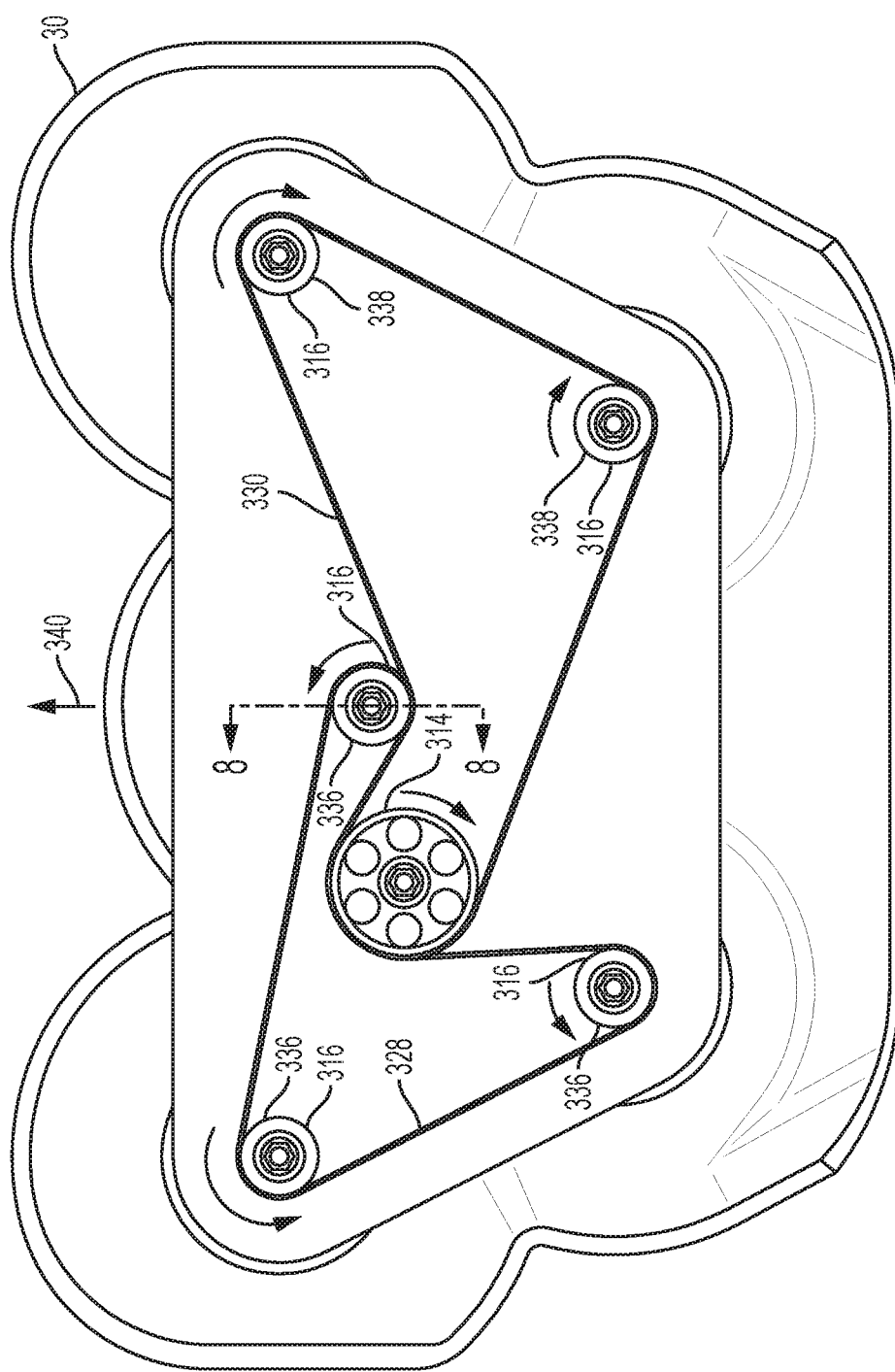
FIG. 21 is a top view of the five-spindle high-efficiency lawn maintenance tool of FIG. 19.

Turning to FIG. 21, the high-efficiency blade 46 drive components are shown in a top view with the belt cover 286 removed for clarity. A first drive belt 328 interacts with the drive pulley 314 to receive power that is transmitted to the driven pulleys 316 as the first drive belt 328 rotates about the pulleys 314, 316. Similarly, a second drive belt 330 is located at a different elevation and takes rotational power from the drive pulley 314 and transmits that rotational power to the driven pulleys 316. In this top view, if the drive pulley 314 is rotated in the clockwise direction, each of the three center and left-side driven pulleys 336 rotate in the counter-clockwise direction, and each of the two right-side driven pulleys 338 rotate in the clockwise direction. As the high-efficiency lawn maintenance tool 20 moves in the direction represented by arrow 340, the grass clippings cut by the high-efficiency blades 46 associated with the driven pulleys 344 is urged in a direction toward the outside of the high-efficiency lawn maintenance tool 20 rather than toward the interior.

It is to be appreciated that several variables can be altered in order to attain desired high-efficiency blade 46 direction of rotation, rotational speed, etc. to achieve conditions that will best cut grass and vegetation. For example, the path of the drive belts 328, 330 is chosen to achieve the described rotation pattern of the high-efficiency blades 46. Other rotation patterns are also contemplated. In another example, the ratio of the drive pulley 314 diameter to the driven pulley 316 diameter and the number of teeth on each pulley 314, 316 can be modified to obtain a desired high-efficiency blade 46 rotation speed.

Figure 22:
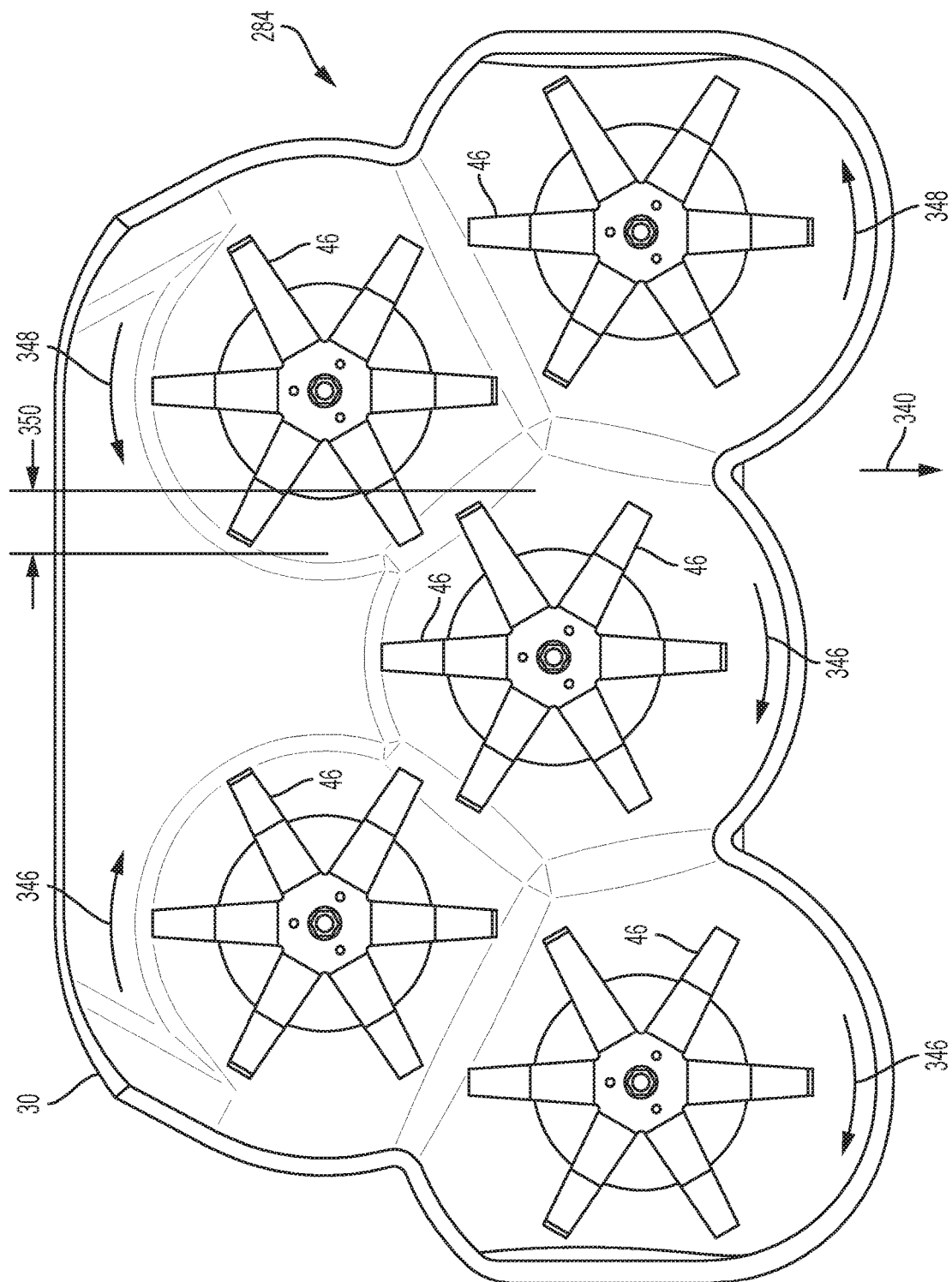
FIG. 22 is a bottom view of the five-spindle high-efficiency lawn maintenance tool of FIG. 19.

Turning to FIG. 22, a bottom view of the high-efficiency blades 46 in the multi-spindle mounting assembly 284 is shown. Similar to FIG. 21, if the lawn maintenance tool 20 is traveling in the direction of arrow 340, the previously described arrangement of the drive components (not shown) causes clockwise rotation (when viewed from below), represented by arrow 346, of the high-efficiency blades 46 to the left and at the center of the figure. Counter-clockwise rotation, represented by arrow 348, is created on the right side high-efficiency blades 46.

FIG. 22 also shows the multi-spindle arrangement can include a cutting path overlap 350 such that two high-efficiency blades 46 pass over a portion of grass to be cut. This helps reduce and/or eliminate the chance of uncut grass remaining after the high-efficiency lawn maintenance tool 20 passes over a section of grass and/or vegetation.

When scaling the design for larger or smaller blade systems, a mathematical relationship between the optimal number of cutting blades, cleaning blades, and the diameter of the high-efficiency blade can be designed for increased efficiency. The mathematical relationship can include a minimum of ten (10) blade passes per foot at a minimum. This relationship may also place a maximum 19,000 feet per minute (fpm) high-efficiency blade 46 tip speed. In one example, a desired high-efficiency blade 46 tip speed can be about 10,000 fpm. In another example, the high-efficiency blade 46 can operate at about 2,200 rpm with a projected 12,000 feet per minute (fpm) blade tip speed. This is a significant reduction from a standard 21-inch diameter system that may operate at 3,200 rpm and have a 19,000 fpm blade tip speed.

It is to be understood that the deck 30 shown in FIGS. 8 and 19, 21, and 22 can be made from any suitable material including, but not limited to, plastic. Furthermore, the deck 30 is configured to be in relatively close proximity to the cleaning blades 54 of the high-efficiency blade 46 such that the underside of the deck 30 stays grass-free or relatively grass-free. It may also be beneficial to include the feature including increased separation distance 274, 276, 280 between the cleaning blade 54 of the high-efficiency blade 46 and the underside of the deck 30 as shown in FIGS. 14-18 in the multi-spindle deck configuration of FIG. 19.

It is also to be understood that the shown example of the multi-spindle lawn maintenance tool includes a single drive spindle 294 providing rotational power for five driven spindles 298. As previously described, the drive spindle 294 takes rotational power from a single power source 36. In other examples, the serpentine drive belts 328, 330, drive spindle 294, and drive pulley 314 can be omitted for an arrangement having one power source (e.g., an electric motor) dedicated to each driven spindle 298. This one-to-one ratio of power sources to driven spindles 298 and, therefore, high-efficiency blades 46 can give rise to using larger numbers of smaller power sources which can lower the cost of each power source to offset the increased number of power sources. In other words, the power sources can be increased in number while finding a common power source size and rating that is commoditized, thereby enabling a cost benefit.

In the shown examples, the deck 30 does not include a chute for grass clippings, such that there is no exit port from which cut grass clippings are expelled from the lower volume, which is defined by the lower surface of the deck 30. The high-efficiency blade 46 of the high-efficiency lawn maintenance tool 20 is configured to cut the grass and the grass cuttings are then directed downwardly back toward the ground, as explained above. As such, there are little to no quantities of grass clippings swirling around within the lower volume that need to be expelled from a chute. However, it is worthy of note that the present disclosure contemplates the addition of a grass clipping discharge chute that can be included in the deck 30 to aid in grass clipping collection, should the operator so desire.

In another example, the deck 30 is formed as a low-profile deck such that the depth of the deck 30 is about the same depth as the high-efficiency blade 46. Returning to FIG. 8, the depth of the deck 30 is represented by dimension 354 while the depth of the high-efficiency blade is represented by dimension 356. Typical mower decks require a depth that is significantly greater than the thickness of the high-efficiency blade 46 in order to allow circulation of the grass clippings within the lower volume below the deck 30 until they are expelled radially outward through a chute. However, because the grass clippings created by the high-efficiency blade 46 are directed downwardly toward the ground and not circulated underneath the deck 30, there is no need for additional depth of the deck 30. It should be understood by one having ordinary skill in the art that the deck 30 can be formed as a substantially flat deck having sufficient depth or space between the high-efficiency blade 46 and the edge of the deck 30 to comply with safety standards for mower decks and blades.

Figure 23:
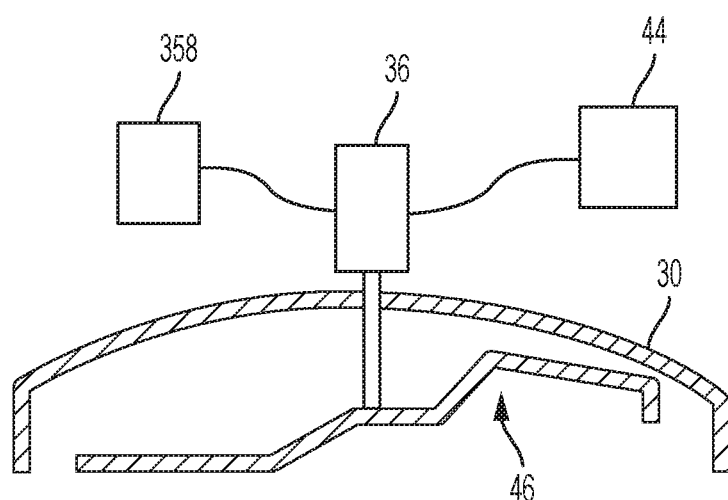
FIG. 23 is a schematic representation of a controller used in conjunction with the high-efficiency lawn maintenance tool.

In another example, the high-efficiency lawn maintenance tool 20 can be self-propelled by using the power source 36 located on the deck 30. In yet another example, the high-efficiency lawn maintenance tool 20 can include a controller 358 as shown in the schematic of FIG. 23. The controller 358 can enable the power source 36 (e.g., an electric motor) to provide infinitely variable power delivery to the high-efficiency blade 46. The controller 358 can analyze the load on the high-efficiency blade 46 to vary the electric power delivered to the power source 36. For example, if the controller 358 senses a relatively small magnitude load, e.g., from short, dry grass cutting operations, the controller 358 can slow the electric motor 36 by decreasing the electrical current draw from a battery 44 to the electric motor 36. Conversely, larger loads on the high-efficiency blade 46 can trigger the controller 358 to provide a greater electrical current to the electric motor 36 to increase the rotational speed of the electric motor 36, thereby increasing the rotational speed of the high-efficiency blade 46. In another example, the controller 358 can vary both the speed and the torque delivered from the power source 36 to achieve an optimal grass cutting condition.

Figure 24:
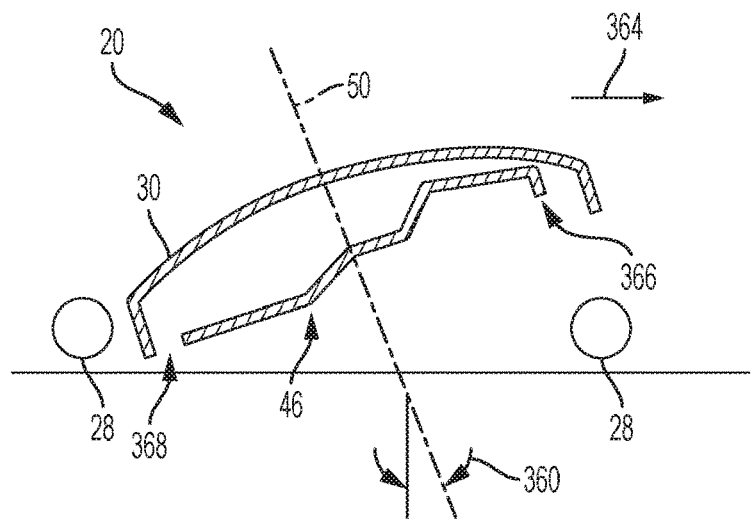
FIG. 24 is a side view schematic of the high-efficiency lawn maintenance tool showing a rearward tilt of the deck and high-efficiency blade.

Turning to FIG. 24, grass and vegetation cutting optimization can also be affected by the front-to-back tilt of some components of the high-efficiency lawn maintenance tool 20. FIG. 24 shows a rearward tilt of the deck 30 and the high-efficiency blade 46 to create a tilt angle represented by angle 360. As shown, the central axis 50 is tilted in a rearward direction such that the central axis 50 is not vertical. In other words, as the high-efficiency lawn maintenance tool 20 moves in the direction of arrow 364, the first portion 366 (forward part) of the high-efficiency blade 46 to encounter a particular section of uncut grass and/or vegetation is higher in elevation than the last portion 368 (rearward part) of the high-efficiency blade 46 to cut the same particular section of grass and/or vegetation. This tilt can improve the cut quality, as the high-efficiency blade 46 first cuts the grass at a higher elevation at the first portion 366 (forward part) of the high-efficiency blade 46 and the grass is cut again at the last portion 368 (rearward part) of the high-efficiency blade 46 producing a "double cut" effect. Dispersion of mulched clippings can also be improved with this orientation.

This dual-cutting operation can also require more power from the power source 36, thereby limiting battery run-time or increasing the amount of gasoline or electrical power consumed by the high-efficiency lawn maintenance tool 20. These competing interests can be balanced to find an optimal tilt angle 360. In one example, the tilt angle 360 of the deck 30 and high-efficiency blade 46 is less than 3 degrees from normal. More particularly, the tilt angle 360c an be between 1½ degrees and 2 degrees. In another example, the tilt angle 360 may be optimized to produce a cutting blade difference in elevation of about 0.15 inch to about 0.20 inch difference between the forward part 366 and rearward part 368 of the cutting blades 56. FIG. 24 may show an exaggerated tilt angle 360 to emphasize the tilt orientation and effect on the high-efficiency blade 46.

Figure 25:
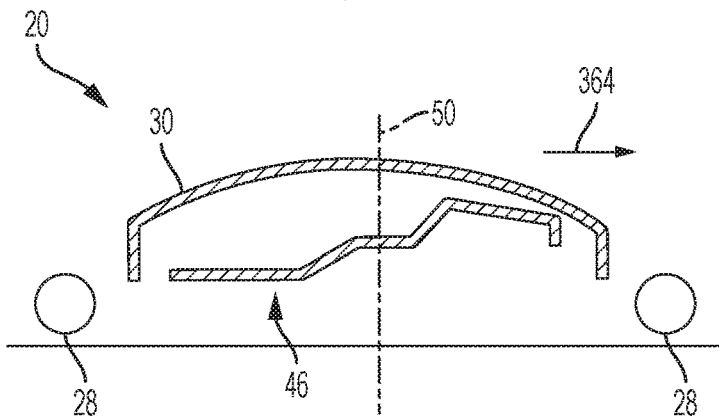
FIG. 25 is similar to FIG. 24, showing a level deck and high-efficiency blade.

Turning to FIG. 25, the high-efficiency lawn maintenance tool 20 can be configured to include no tilt of the deck 30 and the high-efficiency blade 46. In other words, the central axis 50 is vertical. This orientation can sometimes be the best compromise between energy consumption and grass cut quality and mulched clipping dispersion.

Figure 26:
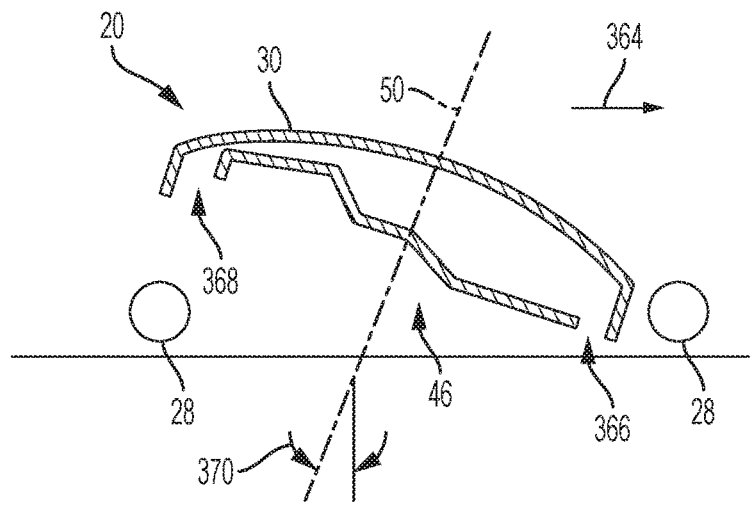
FIG. 26 is similar to FIG. 24, showing a frontward tilt of the deck and high-efficiency blade.

FIG. 26 shows the high-efficiency lawn maintenance tool 20 including a forward tilt (represented by angle 370) as the high-efficiency lawn maintenance tool 20 proceeds in the direction of arrow 364. As shown, the central axis 50 is tilted in a forward direction such that the central axis 50 is not vertical. In other words, as the high-efficiency lawn maintenance tool 20 moves in the direction of arrow 364, the first portion 366 (forward part) of the high-efficiency blade 46 to encounter a particular section of uncut grass and/or vegetation is lower in elevation than the last portion 368 (rearward part) of the high-efficiency blade 46. The forward tilt can enable a power savings, as only half of the high-efficiency blade 46 contacts the grass and/or vegetation. The tilt angle 370 can be between about 1½ degrees to about 2 degrees.

The described apparatus can have numerous benefits. The high-efficiency blade 46 can be significantly quieter than typical mower blades when in operation. In some instances, it may be desirable to add a feature to the high-efficiency lawn maintenance tools 20 to alert the operator that the high-efficiency lawn maintenance tool 20 is in operation and the high-efficiency blade 46 may be rotating. Some examples of alerts can include lights, physical movement of an additional structure, or creation of an artificial sound.

The high-efficiency lawn maintenance tool 20 also has a relatively high-efficiency thereby enabling: increased (longer) run-time of the battery, lower cost to operate, or both. The relatively high-efficiency of the high-efficiency lawn maintenance tool 20 can also lead to lower fuel consumption for gasoline-powered lawn maintenance tools, such as the one shown in FIG. 1.

Another possible benefit to the described apparatus is a reduction in the revolutions per minute (rpm) required for optimal grass cutting. For example, the relatively high-speed rotation of typical lawn mower blades can be reduced by as much as 33%. This can enable a reduction in mower operating noise and a reduction in operation energy needs. In one example, the high-efficiency lawn maintenance tool can operate at about 2,200 rpm with a projected 12,000 fpm blade tip speed. This is a significant reduction from a standard 21-inch diameter system as was previously discussed. In some examples, it has been shown that the cutting frequency (how many times a blade cutting surface contacts a blade of grass) can be more important than the tip speed of the mower blade.

While preferred embodiments of the present disclosure have been described, it should be understood that the present disclosure is not so limited and modifications may be made without departing from the present disclosure. The scope of the present disclosure is defined by the appended claims, and all devices, processes, and methods that come within the meaning of the claims, either literally or by equivalence, are intended to be embraced therein.

The invention claimed is:

1. A high-efficiency blade for a lawn maintenance tool comprising:
   a central axis;
   a mounting portion located on the central axis;
   a cutting blade, wherein the cutting blade comprises:
      at least one segment;
      a cutting blade sharpened leading edge, the cutting blade sharpened leading edge is on the lower surface of the cutting blade, wherein the cutting blade sharpened leading edge is generally parallel to a driven surface and the cutting blade sharpened leading edge is configured to cut clippings from vegetation; and
      a cleaning blade, the cleaning blade comprising a cleaning blade sharpened leading edge, wherein the cleaning blade sharpened leading edge is on an upper surface of the cleaning blade, wherein the cleaning blade is vertically offset from the cutting blade and is configured to mulch the associated clippings from vegetation and reduce an associated accumulation of clippings on an underside of an associated mower deck,
      wherein the cleaning blade sharpened leading edge is formed at a reverse angle when compared to the cutting blade sharpened leading edge.

2. The high-efficiency blade according to claim 1, wherein the cutting blade and the cleaning blade are separate arms that extend from the mounting portion.

3. The high-efficiency blade according to claim 1, wherein the cleaning blade is configured to be maintained at a relatively close distance from the underside of the associated mower deck.

4. The high-efficiency blade according to claim 1 comprising three cutting blades and three cleaning blades in alternating positions around the mounting portion.

5. The high-efficiency blade according to claim 1 comprising four cutting blades and four cleaning blades in alternating positions around the mounting portion.

6. The high-efficiency blade according to claim 1, wherein the mounting portion defines a drive aperture and the high-efficiency blade is attached to the lawn maintenance tool with a leaf spring, the leaf spring including drive knobs configured to cooperate with the drive aperture to provide rotational power to the high-efficiency blade.

7. The high-efficiency blade according to claim 1, wherein high-efficiency blade further comprises:
   three arm sections, wherein each arm section includes one cleaning blade and one cutting blade.

8. A high-efficiency lawn maintenance tool comprising:
   a frame;
   a deck, wherein the deck is attached to the frame and the deck defines a downward facing space;
   a high-efficiency blade located within the downward facing space, the high-efficiency blade comprising;
      a central axis;
      a mounting portion located on the central axis of the high-efficiency blade;
      a cutting blade, wherein the cutting blade comprises:
         at least one segment;
         a cutting blade sharpened leading edge, wherein the cutting blade sharpened leading edge is generally parallel to an associated driven surface and the cutting blade sharpened leading edge is configured to cut clippings from vegetation; and
         a cleaning blade, wherein the cleaning blade is vertically offset from the cutting blade,
   a power source, wherein the power source is attached to one of the frame or the deck and the power source provides rotational power to the high-efficiency blade; and
   a plurality of ground engaging members, wherein the ground engaging members are attached to one of the frame or the deck,
   wherein the cleaning blade is configured to follow a rotational path about the central axis, and a portion of the cleaning blade is located within 1-inch to ¹⁄₁₆-inch of the deck over a majority of the rotational path, and
   the deck defines an elevation change such that the cleaning blade is not located within 1-inch to ¹⁄₁₆-inch of the deck over a minority of the rotational path of the cleaning blade.

9. The high-efficiency lawn maintenance tool according to claim 8, wherein the cleaning blade is located within ½-inch to ¹⁄₁₆-inch of the deck over the majority of the rotational path of the cleaning blade, and the cleaning blade is not located within ½-inch to ¹⁄₁₆-inch of the deck at the elevation change.

10. The high-efficiency lawn maintenance tool according to claim 8, wherein the cleaning blade is located within ¼-inch to ¹⁄₁₆-inch of the deck over the majority of the rotational path of the cleaning blade, and the cleaning blade is not located within ¼-inch to ⅟16-inch of the deck at the elevation change.

11. The high-efficiency lawn maintenance tool according to claim 8, wherein the elevation change is located at a forward-facing side of the lawn maintenance tool where the cutting blade first strikes uncut grass and vegetation, and the elevation change extends to an area several degrees past center in the direction of rotation of the high-efficiency blade.

12. The high-efficiency lawn maintenance tool according to claim 8, wherein the elevation change defined by the deck comprises a central, generally horizontal portion, an inlet transition portion prior to the generally horizontal portion and an outlet transition portion after the generally horizontal portion.

13. The high-efficiency lawn maintenance tool according to claim 8, wherein the deck includes a deck vertical dimension and the high-efficiency blade includes a blade vertical dimension the deck vertical dimension is about the same as the blade vertical dimension.

14. The high-efficiency lawn maintenance tool according to claim 8, wherein the controller is configured to optimize the cutting operation by altering the speed and torque of the electric motor.

15. A high-efficiency lawn maintenance tool comprising:
a frame;
a deck, wherein the deck is attached to the frame and the deck defines a downward facing space;
a high-efficiency blade located within the downward facing space, the high-efficiency blade comprising;
a central axis;
a mounting portion located on the central axis of the high-efficiency blade;
a cutting blade, wherein the cutting blade comprises:
at least one segment;
a cutting blade sharpened leading edge, wherein the cutting blade sharpened leading edge is configured to cut clippings from vegetation, wherein the cutting blade is generally horizontal; and
a cleaning blade, the cleaning blade comprising a cleaning blade sharpened leading edge, wherein the cleaning blade is vertically offset from the cutting blade, wherein the cleaning blade is configured such that a portion of the cleaning blade is generally parallel to the underside of the deck,
a power source, wherein the power source is attached to one of the frame or the deck and the power source provides rotational power to the high-efficiency blade; and
a plurality of ground engaging members, wherein the ground engaging members are attached to one of the frame or the deck,
wherein the deck and the high-efficiency blade are tilted such that the central axis is not vertical.

16. The high-efficiency lawn maintenance tool according to claim 15, wherein the central axis is tilted rearward such that a forward part of the high-efficiency blade is higher than a rearward part of the high-efficiency blade.

17. The high-efficiency lawn maintenance tool according to claim 16, wherein the central axis is tilted forward such that a forward part of the high-efficiency blade is lower than a rearward part of the high-efficiency blade.

\* \* \* \* \*